(12) United States Patent
Griffith et al.

(10) Patent No.: US 11,772,282 B2
(45) Date of Patent: Oct. 3, 2023

(54) FLUIDIC SOLAR ACTUATION SYSTEM

(71) Applicant: SUNFOLDING, INC., San Francisco, CA (US)

(72) Inventors: Saul Griffith, San Francisco, CA (US); Leila Madrone, San Francisco, CA (US); Peter S. Lynn, San Francisco, CA (US); Kevin Simon, San Francisco, CA (US); James McBride, San Francisco, CA (US)

(73) Assignee: SUNFOLDING, INC., San Francisco, CA (US)

( * ) Notice: Subject to any disclaimer, the term of this patent is extended or adjusted under 35 U.S.C. 154(b) by 0 days.

(21) Appl. No.: 17/893,145

(22) Filed: Aug. 22, 2022

(65) Prior Publication Data
US 2022/0410410 A1 Dec. 29, 2022

Related U.S. Application Data

(63) Continuation of application No. 17/371,624, filed on Jul. 9, 2021, now Pat. No. 11,420,342, which is a
(Continued)

(51) Int. Cl.
*B25J 18/06* (2006.01)
*B25J 9/14* (2006.01)
(Continued)

(52) U.S. Cl.
CPC .............. *B25J 18/06* (2013.01); *B25J 9/142* (2013.01); *F03G 6/02* (2013.01); *F16J 3/04* (2013.01);
(Continued)

(58) Field of Classification Search
CPC .... B25J 18/06; B25J 9/142; B25J 9/00; F03G 6/02; F16J 3/04; F24S 23/74;
(Continued)

(56) References Cited

U.S. PATENT DOCUMENTS

| | | |
|---|---|---|
| 979,460 A | 12/1910 | Fulton |
| 2,920,656 A | 1/1960 | Bertolet |

(Continued)

FOREIGN PATENT DOCUMENTS

| | | |
|---|---|---|
| AU | 2020239824 A1 | 10/2020 |
| CA | 2330612 A1 | 6/2002 |

(Continued)

OTHER PUBLICATIONS

"Final Rejection dated Sep. 9, 2016," U.S. Appl. No. 14/064,072, filed Oct. 25, 2013, 15 pages.
(Continued)

*Primary Examiner* — Hoang M Nguyen
(74) *Attorney, Agent, or Firm* — Davis Wright Tremaine LLP

(57) ABSTRACT

A fluidic solar actuation system comprising a plurality of fluidic solar actuators that each include a first fluidic inflatable actuator, and a second fluidic inflatable actuator. The system also includes a fluidic routing system configured to covey a fluid originating from a fluid source to: the respective first fluidic inflatable actuators of the plurality of fluidic solar actuators, the first fluidic inflatable actuators ganged so as to be fluidically connected such that the first fluidic inflatable actuators are configured to be inflated together and separate from the second fluidic inflatable actuators, and the respective second fluidic inflatable actuators of the plurality of fluidic solar actuators, the second fluidic inflatable actuators ganged so as to be fluidically connected such that the second fluidic inflatable actuators are configured to be inflated together and separate from the first fluidic inflatable actuators.

20 Claims, 31 Drawing Sheets

Related U.S. Application Data continuation of application No. 16/506,833, filed on Jul. 9, 2019, now Pat. No. 11,059,190, which is a continuation of application No. 15/456,347, filed on Mar. 10, 2017, now Pat. No. 10,384,354, which is a continuation of application No. 14/064,070, filed on Oct. 25, 2013, now Pat. No. 9,624,911.

(60) Provisional application No. 61/719,313, filed on Oct. 26, 2012, provisional application No. 61/719,314, filed on Oct. 26, 2012.

(51) Int. Cl.
| | |
|---|---|
| *F24S 50/20* | (2018.01) |
| *F24S 50/00* | (2018.01) |
| *F24S 30/425* | (2018.01) |
| *F24S 23/74* | (2018.01) |
| *F24S 30/48* | (2018.01) |
| *F24S 30/428* | (2018.01) |
| *F24S 30/452* | (2018.01) |
| *F16J 3/04* | (2006.01) |
| *H02S 20/32* | (2014.01) |
| *F03G 6/02* | (2006.01) |
| *H02S 40/00* | (2014.01) |
| *B25J 9/00* | (2006.01) |
| *F24S 30/00* | (2018.01) |

(52) U.S. Cl.
CPC ............. *F24S 23/74* (2018.05); *F24S 30/425* (2018.05); *F24S 30/428* (2018.05); *F24S 30/452* (2018.05); *F24S 30/48* (2018.05); *F24S 50/00* (2018.05); *F24S 50/20* (2018.05); *H02S 20/32* (2014.12); *H02S 40/00* (2013.01); *B25J 9/00* (2013.01); *F24S 2030/115* (2018.05); *F24S 2050/25* (2018.05); *Y02E 10/40* (2013.01); *Y02E 10/46* (2013.01); *Y02E 10/47* (2013.01); *Y10S 901/22* (2013.01)

(58) Field of Classification Search
CPC ...... F24S 30/425; F24S 30/428; F24S 30/452; F24S 30/48; F24S 50/00; F24S 50/20; F24S 2030/115; F24S 2050/25; H02S 20/32; H02S 40/00; Y02E 10/40; Y02E 10/46; Y02E 10/47; Y10S 901/22
USPC ................... 60/641.8–641.15; 126/572, 604
See application file for complete search history.

(56) References Cited

U.S. PATENT DOCUMENTS

| | | | |
|---|---|---|---|
| 3,284,964 A | 11/1966 | Norio | |
| 3,472,062 A | 10/1969 | Owen | |
| 3,602,047 A | 8/1971 | Kistler | |
| 3,800,398 A | 4/1974 | Harrington, Jr. | |
| 3,956,543 A | 5/1976 | Stangeland | |
| 3,982,526 A | 9/1976 | Barak | |
| 4,063,543 A | 12/1977 | Hedger | |
| 4,102,326 A | 7/1978 | Sommer | |
| 4,120,635 A | 10/1978 | Langecker | |
| 4,154,221 A | 5/1979 | Nelson | |
| 4,172,443 A | 10/1979 | Sommer | |
| 4,175,540 A | 11/1979 | Roantree et al. | |
| 4,185,615 A * | 1/1980 | Bottum | F24S 30/40 126/601 |
| 4,198,954 A | 4/1980 | Meijer | |
| 4,345,582 A | 8/1982 | Aharon | |
| 4,424,802 A | 1/1984 | Winders | |
| 4,459,972 A | 7/1984 | Moore | |
| 4,464,980 A | 8/1984 | Yoshida | |
| 4,494,417 A | 1/1985 | Larson et al. | |
| 4,566,432 A | 1/1986 | Sobczak et al. | |
| 4,620,771 A | 11/1986 | Dominguez | |
| 4,751,868 A | 6/1988 | Paynter | |
| 4,768,871 A | 9/1988 | Mittelhauser et al. | |
| 4,777,868 A | 10/1988 | Larsson | |
| 4,784,042 A * | 11/1988 | Paynter | F15B 15/103 92/92 |
| 4,832,001 A | 5/1989 | Baer | |
| 4,848,179 A | 7/1989 | Ubhayakar | |
| 4,900,218 A | 2/1990 | Sutherland | |
| 4,939,982 A | 7/1990 | Immega et al. | |
| 4,954,952 A | 9/1990 | Ubhayakar et al. | |
| 4,977,790 A | 12/1990 | Nishi et al. | |
| 5,021,798 A | 6/1991 | Ubhayakar | |
| 5,040,452 A | 8/1991 | Van Kerkvoort | |
| 5,080,000 A | 1/1992 | Bubic et al. | |
| 5,156,081 A | 10/1992 | Suzumori | |
| 5,181,452 A * | 1/1993 | Immega | B25J 18/06 92/92 |
| 5,251,538 A | 10/1993 | Smith | |
| 5,317,952 A | 6/1994 | Immega | |
| 5,337,732 A | 8/1994 | Grundfest et al. | |
| 5,386,741 A | 2/1995 | Rennex | |
| 5,469,756 A | 11/1995 | Feiten | |
| 5,697,285 A | 12/1997 | Nappi et al. | |
| 5,816,769 A | 10/1998 | Bauer et al. | |
| 6,046,399 A | 4/2000 | Kapner | |
| 6,054,529 A | 4/2000 | O'Donnell et al. | |
| 6,080,927 A | 6/2000 | Johnson | |
| 6,178,872 B1 | 1/2001 | Schulz | |
| 6,363,928 B1 | 4/2002 | Anderson, Jr. | |
| 6,557,804 B1 | 5/2003 | Carroll | |
| 6,772,673 B2 | 8/2004 | Seto et al. | |
| 6,875,170 B2 | 4/2005 | Francois et al. | |
| 7,331,273 B2 | 2/2008 | Kerekes et al. | |
| 7,531,741 B1 | 5/2009 | Melton et al. | |
| 7,614,615 B2 | 11/2009 | Egolf | |
| 8,201,473 B2 | 6/2012 | Knoll | |
| 8,305,736 B2 | 11/2012 | Yee et al. | |
| 8,657,271 B2 | 2/2014 | Szekely et al. | |
| 8,700,215 B2 | 4/2014 | Komatsu et al. | |
| 8,863,608 B2 | 10/2014 | Fischer et al. | |
| 8,899,359 B1 | 12/2014 | Hafenrichter et al. | |
| 9,133,864 B2 | 9/2015 | Menon et al. | |
| 9,624,911 B1 * | 4/2017 | Griffith | F24S 50/20 |
| 9,641,123 B2 | 5/2017 | Swahn et al. | |
| 9,806,669 B2 | 10/2017 | Michotte De Welle | |
| 9,919,434 B1 | 3/2018 | Rey et al. | |
| 10,135,388 B2 * | 11/2018 | Madrone | H02S 20/32 |
| 10,284,354 B2 | 5/2019 | Sebire et al. | |
| 10,384,354 B2 * | 8/2019 | Griffith | F24S 50/00 |
| 10,562,180 B2 | 2/2020 | Telleria et al. | |
| 10,601,366 B2 | 3/2020 | Madrone et al. | |
| 10,605,365 B1 | 3/2020 | Griffith et al. | |
| 10,917,038 B2 | 2/2021 | Basel et al. | |
| 10,944,353 B2 | 3/2021 | Basel et al. | |
| 11,059,190 B2 * | 7/2021 | Griffith | F24S 50/20 |
| 11,420,342 B2 * | 8/2022 | Griffith | F24S 50/20 |
| 11,502,639 B2 | 11/2022 | Betts et al. | |
| 2005/0034752 A1 | 2/2005 | Gross et al. | |
| 2005/0284467 A1 | 12/2005 | Patterson | |
| 2006/0049195 A1 | 3/2006 | Koussios et al. | |
| 2009/0097994 A1 | 4/2009 | Beck et al. | |
| 2009/0115292 A1 | 5/2009 | Ueda et al. | |
| 2009/0151775 A1 | 6/2009 | Pietrzak | |
| 2009/0314119 A1 | 12/2009 | Knoll | |
| 2010/0043776 A1 | 2/2010 | Gee | |
| 2010/0125401 A1 | 5/2010 | Hamama et al. | |
| 2010/0180883 A1 | 7/2010 | Oosting | |
| 2011/0073161 A1 | 3/2011 | Scanlon | |
| 2011/0114080 A1 * | 5/2011 | Childers | F16M 11/125 126/584 |
| 2011/0277815 A1 | 11/2011 | Sankrithi | |
| 2012/0210818 A1 | 8/2012 | Fischer et al. | |
| 2012/0285509 A1 | 11/2012 | Surganov | |
| 2013/0247962 A1 | 9/2013 | Sakai et al. | |
| 2013/0306135 A1 | 11/2013 | Planting | |
| 2015/0244309 A1 | 8/2015 | Sakai et al. | |
| 2016/0052347 A1 | 2/2016 | Nagai et al. | |

(56) References Cited

U.S. PATENT DOCUMENTS

| | | | |
|---|---|---|---|
| 2016/0123592 | A1 | 5/2016 | Drake et al. |
| 2016/0261224 | A1 | 9/2016 | Madrone et al. |
| 2017/0163208 | A1 | 6/2017 | Almy et al. |
| 2017/0184327 | A1 | 6/2017 | Griffith et al. |
| 2017/0282360 | A1 | 10/2017 | Felleria et al. |
| 2018/0302025 | A1 | 10/2018 | Basel et al. |
| 2018/0302026 | A1 | 10/2018 | Basel et al. |
| 2018/0302027 | A1 | 10/2018 | Betts et al. |
| 2019/0372512 | A1 | 12/2019 | Betts et al. |
| 2020/0304057 | A1 | 9/2020 | Suan et al. |

FOREIGN PATENT DOCUMENTS

| | | |
|---|---|---|
| CL | 201501867 | 6/2015 |
| CL | 201701939 | 7/2017 |
| CN | 101783619 A | 7/2010 |
| CN | 103222067 A | 7/2013 |
| CN | 103786165 A | 5/2014 |
| CN | 104160220 A | 11/2014 |
| CN | 205986743 U | 2/2017 |
| CN | 107251414 A | 10/2017 |
| CN | 208063113 U | 11/2018 |
| CO | 09035821 | 4/2009 |
| CO | 6180473 A2 | 7/2010 |
| CO | 6450667 A2 | 5/2012 |
| DE | 202011050327 U1 | 9/2012 |
| EP | 2648226 A1 | 10/2013 |
| EP | 3736974 A1 | 11/2020 |
| FR | 2603228 A1 | 3/1988 |
| JP | 2014116360 A | 6/2014 |
| KR | 101034478 B1 | 5/2011 |
| KR | 20130019502 A | 2/2013 |
| RU | 2012137650 A | 3/2014 |
| RU | 2516595 C2 | 5/2014 |
| RU | 2560652 C2 | 8/2015 |
| RU | 2611571 C1 | 2/2017 |
| SU | 358814 A3 | 11/1972 |
| SU | 1346918 A1 | 10/1987 |
| TW | 201115088 A | 5/2011 |
| TW | 201116726 A | 5/2011 |
| WO | 0117731 A1 | 3/2001 |
| WO | 2009108159 A1 | 9/2009 |
| WO | 2011094084 A2 | 8/2011 |
| WO | 2012015378 A1 | 2/2012 |
| WO | 2016123592 A1 | 8/2016 |
| WO | 2018195116 A1 | 10/2018 |

OTHER PUBLICATIONS

"Non-Final Rejection dated Aug. 18, 2016," U.S. Appl. No. 14/064,071, filed Oct. 25, 2013, 13 pages.
Australia IPO Notice of Acceptance dated Aug. 22, 2022, Patent Application No. 2020239824, 3 pages.
Australian First Examination Report dated Jul. 12, 2022, Patent Application No. 2018255296, filed Apr. 17, 2017, 5 pages.
Australian IPO First Examination Report for Patent No. 2019277145 dated Jul. 28, 2022, 3 pages.
Australian IPO Search Report dated Aug. 25, 2021, Patent Application No. 2020239821, 3 pages.
Australian Notice of Allowance dated Aug. 11, 2022, Patent Application No. 2020239824, 3 pages.
Australian Second Examination Report dated Jun. 30, 2022, Patent Application No. 2020239824, filed Oct. 15, 2019, 3 pages.
Author Unkown, http://www.utilityscalesolar.com/Utility_Scale_Solar,_Inc./USS_Homepage.html, Utility Scale Solar, Inc., 2011.
Brazilian Preliminary Office Action dated Jul. 15, 2022, Patent Application No. 1120170164612, filed Jan. 30, 2016, 4 pages.
Brazilian Preliminary Office Action dated Jun. 30, 2020, Patent Application No. 1120170164612, filed Jan. 30, 2016, 4 pages.
Brazilian Preliminary Office Action dated Oct. 11, 2022, Patent Application No. 2019277145, 4 pages.
Brazilian Preliminary Office Action dated Oct. 11, 2022, Patent Application No. 122020010462-7, filed Jan. 30, 2016, 4 pages.
Brazilian Preliminary Office Action dated Sep. 20, 2022, Patent Application No. 1120190217215, 4 pages.
Brazilian Technical Examination Report dated Aug. 2, 2022, Patent Application No. 1120170164612, filed Jan. 30, 2016, 4 pages.
Chile IPO Search Report dated Jun. 17, 2021, Patent Application No. 201902938, 4 pages.
Chilean Notice of Allowance dated Aug. 11, 2022, Patent Application No. 2019-002938, filed Oct. 16, 2019, 2 pages.
China IPO Preliminary Office Action dated Aug. 30, 2022, Patent Application No. 2018800252687, filed Apr. 17, 2018, 3 pages.
Columbian Office Action dated Aug. 9, 2021, Patent Application No. NC2019/0011622, filed Apr. 17, 2018, 7 pages.
European Patent Office Supplementary Search Report dated Aug. 18, 2021, Reference E35151EP, Application No. 19810208.9, 8 pages.
Inidia Intellectual Property Office Examination Report for Patent Application No. 202017044335 dated Jul. 9, 2022, 6 pages.
Intellectual Property India First Examination Report dated Sep. 7, 2022, Patent Application No. 2020170044335, 5 pages.
International Search Report and Written Opinion dated Aug. 14, 2017, International Patent Application No. PCT/US2017/024730, filed Mar. 29, 2017.
International Search Report and Written Opinion dated Aug. 2, 2018, International Patent Application No. PCT/JS2018/028020, filed Apr. 17, 2018, 7 pages.
International Search Report and Written Opinion dated Aug. 2, 2018, International Patent Application No. PCT/US2018/028024, filed Apr. 17, 2018, 7 pages.
International Search Report and Written Opinion dated Aug. 29, 2019, Patent Application No. PCT/US2019/034202, filed May 28, 2019, 7 pages.
International Search Report and Written Opinion dated Aug. 9, 2018, International Patent Application No. PCT/US2018/028025, filed Apr. 17, 2018, 7 pages.
International Search Report and Written Opinion dated May 5, 2016, International Patent Application No. PCT/US2016/015857, filed Jan. 30, 2016.
International Search Report and Written Opinion dated Sep. 2, 2021, International Patent Application No. PCT/US2021/038534, filed Jun. 22, 2021.
International Search Report and Written Opinion dated Sep. 2, 2021, Patent Application No. PCT/US2021/038534, 7 pages.
Seba, "Solar Trillions," pp. 246-250, Jan. 28, 2010.
The Wiley Encyclopedia of Packaging Technology 3rd Ed., Wiley Publications, p. 145, Sep. 2009.
International Search Report and Written Opinion dated Feb. 28, 2023, International Patent Application No. PCT/US2022/079178, 11 pages.
Taiwan Notice of Allowance dated Patent Application No. 107113086, dated Feb. 2, 2023, 4 pages.
Argentina IPO Office Action for Patent No. 20190101450 dated Jan. 23, 2023, 3 pages.
Brazilian Written Opinion dated Mar. 7, 2023, Patent Application No. 1220200104627, 5 pages.
China IPO Notice of Allowance in Applcation No. 201880025268.7 dated Mar. 26, 2023, 4 pages.
Japan Patent Office Notification of Reasons for Refusal of Application No. 2020-556856 dated Mar. 6, 2023, 6 pages.
Australian First Examination Report dated Jan. 25, 2023, Patent Application No. 2018254424, 3 pages.
Brazilian Notice of Allowance dated Patent Application No. 1120170164612, filed Dec. 6, 2022, 4 pages.
USPTO Non-Final Office Action dated May 11, 2023, U.S. Appl. No. 17/178,152, 14 pages.
Brazilian Preliminary Office Action dated May 9, 2023, Patent Application No. 1120200242900, filed May 28, 2019, 4 pages.
USPTO Non-Final Office Action dated Jun. 1, 2023, U.S. Appl. No. 17/178,593, 14 pages.
Australian Second Examination Report dated May 18, 2023, Patent Application No. 2018255296, 3 pages.

(56) References Cited

OTHER PUBLICATIONS

Australian Second Examination Report dated May 22, 2023, Patent Application No. 2018254424, 4 pages.
Australian Notice of Allowance dated May 24, 2023, Patent Application No. 2019277145, 3 pages.
Australian Patent Office, "Notice of Acceptance for Patent Application" in application No. 2018255296, dated Jun. 23, 2023, 57 pages.
Taiwan Office Action dated Jul. 21, 2023, Patent Application No. 108118640, 11 pages.
USPTO Non-Final Office Action dated Jul. 7, 2023, U.S. Appl. No. 17/979,691, 11 pages.

\* cited by examiner

FLUIDIC SOLAR ACTUATION SYSTEM

CROSS REFERENCE TO OTHER APPLICATIONS

This application is a continuation of, and claims priority to, U.S. application Ser. No. 17/371,624, entitled FLUIDIC SOLAR ACTUATOR, filed Jul. 9, 2021, and claims priority to, U.S. application Ser. No. 16/506,833, now U.S. Pat. No. 11,059,190, entitled FLUIDIC SOLAR ACTUATOR, filed Jul. 9, 2019, which is a continuation of, and claims priority to, U.S. application Ser. No. 15/456,347, now U.S. Pat. No. 10,384,354, entitled FLUIDIC SOLAR ACTUATOR, filed Mar. 10, 2017, which is a continuation of, and claims priority to, U.S. application Ser. No. 14/064,070, now U.S. Pat. No. 9,624,911, entitled FLUIDIC SOLAR ACTUATOR, filed Oct. 25, 2013, which are incorporated herein by reference for all purposes.

U.S. application Ser. No. 14/064,070 claims priority to U.S. Provisional Patent Application No. 61/719,313 entitled FLUIDIC SOLAR ACTUATION filed Oct. 26, 2012 which is incorporated herein by reference for all purposes.

U.S. application Ser. No. 14/064,070 claims priority to U.S. Provisional Patent Application No. 61/719,314 entitled BELLOW ROBOT filed Oct. 26, 2012 which is incorporated herein by reference for all purposes.

BACKGROUND OF THE INVENTION

There are a variety of actuation techniques in the world today for solar actuation. Typically, they are expensive and complicated.

BRIEF DESCRIPTION OF THE DRAWINGS

Various embodiments of the invention are disclosed in the following detailed description and the accompanying drawings.

DETAILED DESCRIPTION

Figure 1:
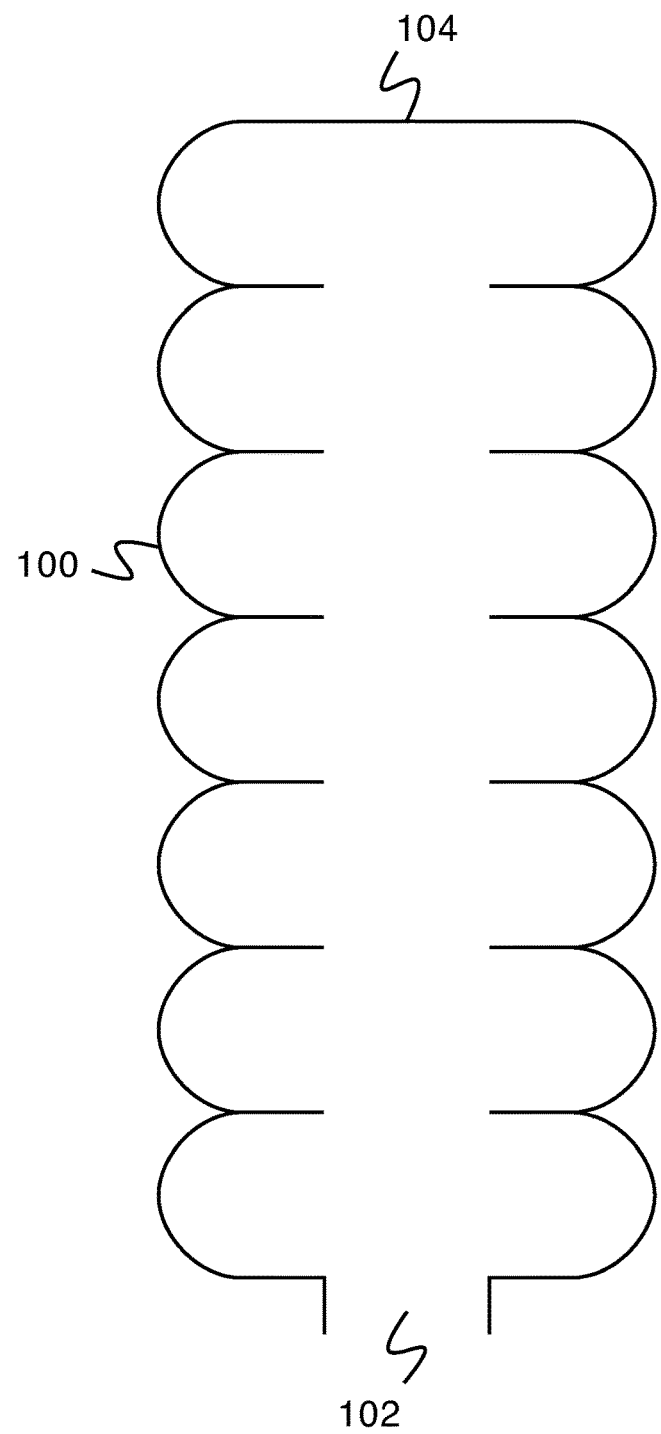
FIG. 1 is a diagram illustrating a cross section of an embodiment of a fluidic actuator.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A solar actuator is disclosed. A solar actuator comprises a top coupler, a bottom coupler, and a plurality of fluidic bellows actuators, wherein a fluidic bellows actuator of the plurality of fluidic bellows actuators moves the top coupler relative to the bottom coupler.

In some embodiments, a solar actuator system comprises a central electronic control with a fluid carrier such as tubing or a manifold delivering fluid to each chamber. In various embodiments, the fluid source for a gas comprises an external compressor, a compressed gas container, a pump, or any other appropriate gaseous fluid source. In some embodiments, the fluid source is external to an embedded control system and controlled via an input valve with or without a regulator. In some embodiments, the pressurized fluid is created in-situ. In some embodiments, system pressures are regulated externally to the system. In some embodiments, system pressures are regulated internally. In some embodiments, a fluid source comprising a liquid is housed internally. In some embodiments, a fluid source comprising a liquid is housed externally to the system and recycled. In some embodiments, chambers are ganged (e.g., connected) fluidically. In some embodiments, chambers are actuated via a valve or pump system. In various embodiments, the valve or pump system comprises a single valve per chamber, a one-to-many demultiplexing valve for control of many outputs from a single device and input, matrix multiplexed chambers, array addressed chambers (e.g., similar in topology to that used in a liquid crystal display) or any other appropriate valve or pump system. In various embodiments, the valve type comprises a piezo valve, a shape memory alloy valve, an electromechanical valve, a rolling diaphragm valve, a rotary selector, an electrostatic valve, or any other appropriate valve type.

In some embodiments, the solar actuation system comprises a network embedded based control system. The solar actuation system comprises sensors. In various embodiments, the solar actuation system comprises pressure sensors, temperature sensors, flow sensors, volume sensors, vision sensors, hall effect sensors, inclinometers, accelerometers, inertial measurement units, magnetometers, gyroscopes, interferometers, sonar sensor, reflective sensor, capacitive sensor, pressure transducers, thermocouples, thermistors, flex sensors, humidity, UV, direct/indirect solar radiation sensors, optical sensors, spectrometers, or cameras, or any other appropriate sensors. In some embodiments, the network embedded based control system is able to communicate with a central command and control, an external calibration system, or other control systems. In various embodiments, the network embedded control system is able to control valves, pumps, or any other appropriate fluidic control actuators.

In various embodiments, the solar actuation system is used for redirection, reflection, or collection of electromagnetic energy sources (e.g., the sun); redirection of light to a receiver for concentrated solar applications; positioning of a photovoltaic panel; positioning of a concentrated photovoltaic panel; redirection of light for heating of water or other fluid; enhanced oil recovery; desalination; configurable optical surfaces; atmospheric water extraction; environmental cooling or heating; redirection of light for illumination; direct chemical fuel generation (e.g., photochemical or thermochemical); or any other appropriate application.

A fluidic actuator is disclosed. A fluidic actuator comprises a chamber, wherein the chamber is provided using a mass manufacturing technique, wherein the chamber is formed from a material that has a higher strength and a higher stiffness in at least two axes relative to at most one other axis, and wherein the chamber allows a volume change by localized bending of a chamber wall.

A fluidic actuator comprises an actuator wherein fluid pressure or volume is used to create either force or movement or position. The actuator geometry and fluid pressure or fluid volume are used instead of or in conjunction with the material properties of the actuator to provide positioning, movement, and strength. The actuator comprises one or more sealed fluidic chambers that respond to changes in fluid pressure or fluid volume, rather than using sliding seals to allow actuation. Pressurized volume change, and thereby mechanical work, is achieved through deformation of a thin walled pressure vessel, not through movement of a sliding contact seal along a surface. This allows for hermetic sealing (the elimination of seal leakage pathways), the elimination of seal friction, the elimination of seal wear, and the elimination of constant geometry high tolerance surfaces capable of sustaining an effective moving seal. The actuators described may either be made from a material that is inherently air or liquid tight, or may include a separate open-volume actuator with an internal or integrated bladder. Volume change is created through bellows geometry, where the term bellows is considered in its broadest definition to cover any variable volume continuous surface pressure vessel. The geometry is ideally optimized to enable compliance in the desired degrees of freedom and relative stiffness and/or strength along non-desired degrees of freedom. Bellows inspired actuators can be created where volume change is created through anisotropic material properties. For example, material, e.g., cloth, could be woven into a tube such that the axial direction has large compliance, but the hoop (circumferential) direction is very stiff. Very high strength or stiffness materials can be formed into actuators with very thin walls that can bend and create volume change while being highly resistant to stretching and able to carry high loads.

The design of the actuator includes creating shapes such that bending takes place in the appropriate locations (e.g., in a chamber wall). The compliance properties of the chamber of the actuator and its ability to deform under pressure is created through the geometry of the design rather than the elastic properties of the material. Distributed localized buckling creation of a chamber wall can be used to control large scale buckling behavior. Bellows inspired actuators can additionally be created where a volume change is created through the deflection of one or more convolutions or one or more levels of convolutions—for example, longitudinal or hoop convolutions, or convolutions forming ribs along a larger doughnut shaped convolution. In various embodiments, convolutions are additionally non-uniform, discontinuous, asymmetric in order to make complex motions possible (e.g., an actuator that creates a motion simulating a human finger), or have any other appropriate properties. In various embodiments, the shape of the convolutions, the number of the convolutions and the wall thickness are designed based on the expected load, the desired range of motion, pressure, or operating characteristics, or any other design criteria.

The fluidic actuator is formed using a mass manufacturing technique. For example by blow molding, injection molding, rotational molding, 3-Dimensional (3D) printing, or extrusion or any other appropriate mass manufacturing or high volume manufacturing technique. In some embodiments, the blow molding of the actuator uses plastic—for example, a thermoplastic/thermopolymer. In various embodiments, the thermoplastic for blow molding comprises acrylonitrile butadiene styrene (ABS), poly vinyl chloride (PVC), polyethylene terephthalate glycol (PETG), polyethylene terephthalate (PET). Polycarbonate, Thermoplastic Elastomers, Polyethylene (high density PE (HDPE), low density PE (LDPE), linear low density PE (LLDPE), ultra high molecular weight PE (UHMWPE)), Polypropylene (Homopolymer and Copolymer), Polystyrene, Polysulfone, Acetal, Nylon, polybutylene terphthalate (PBT), polyetheretherketone (PEEK), polytetrafluoroethylene (PTFE), polyphenylene sulfide (PPS), polyvinylidene fluoride (PVDF) or any other appropriate plastic. In some embodiments, the plastic comprises a thermoset plastic. In various embodiments, the thermoset comprises one of the following: silicone, epoxy, polyester, polyimide, latex, polyurethane, natural rubbers, vinyl, or any other appropriate thermoset plastic. Blow molding a plastic has the advantage that polymer chains are aligned during the blow molding process, with the effect of strengthening and stiffening the material. Plastic is a cheap material to mass manufacture, and a large volume of parts can be made from a single mold. In some embodiments, fibers are added to the plastic material to improve material strength and stiffness and to enable greater control over anisotropic properties. During design of the fluidic actuator, the blow molding process is considered in order to ensure that the actuator is amenable to blow molded manufacturing. In some embodiments, a multi-stage blow molding process is used to apply one or more coatings—for example, an aluminized Mylar film for improving UV resistance, fluid impermeability, temperature and chemical resistance, resistance to abrasion, etc. In some embodiments, the blow molding process directly creates an airtight chamber that is used for both structural strength and for containing fluid. In some embodiments, the mass manufacturing technique (e.g., blow molding) creates a single material structure for the fluidic actuator. In some embodiments, the design of a convolution of the fluidic actuator is for a blow molding manufacturing process.

In some embodiments, the actuator is required to be low cost (e.g. large scale energy generation). In some embodiments, the actuator is required to be low weight (e.g. roof-top solar application). In all cases the actuator is required to be strong in the sense of providing required stiffness. As a material component of the actuator PET is particularly interesting because it is a low cost, low density material that when elongated (e.g. through a blow molding process) can achieve comparatively high strengths.

In some embodiments, there are some cases where stiffness is a concern, for example, when trying to do precise control (e.g., in the case of precise open loop CNC machine type operations) as opposed to just applying large forces (e.g., in the case of lifting heavy objects). In some embodiments, in the realm of a high force situation—for example, when using a highly compressible gas material, stiffness is not typically significant to overall stiffness. In the hydraulic case, where the fluid is largely in-compressible, the material stiffness (as opposed to the material strength), is more significant. In some embodiment, it is desirable to ignore material stiffness, except that the elastic range of the actuator needs to be tuned, whether by geometry or material properties, to the desired range of motion of the actuator in the axis of actuator motion. In some embodiments, in the axis, for example, the hoop direction, it is desirable to just build the cheapest pressure vessel possible—good cost to strength material properties.

In some embodiments, when high strength is discussed, this is defined as use of significant anisotropic material properties, for example, the use of wire rope or fibers, or, the use of significant polymer alignment along the desired direction. For example, by using elongated PET (e.g., the blow molding process stretches and aligns the polymers within the material, achieving far higher strengths along the axis of stretching than injection molding alone), the strength is greatly increased and the mass/cost is reduced in that axis of stretch. In some embodiments, in the case of a cylindrical pressure vessel, which closely relates to a bellows, ideally it is desired to have twice as much strength in the hoop direction as in the axial direction. In the event that maximizing the strength in the hoop direction and axial direction (the former needing to be twice the latter) and not caring about strength in the wall thickness direction, the material properties should be biased to match, whether this is by specific directional fiber addition and orientation, or careful control of a manufacturing process (e.g., blow molding process) to stretch the preform in those directions. This process gets more complicated when applied to a bellows as there are optimizations/trade offs between hoop and axial strength where it is possible to in some cases "swap" one for the other. Point being anisotropic properties of the bellows material ideally wants to be tuned to the bellows profile and range of motion requirements. For cost control purposes, it is desirable to apply material strength to the desired material axis and not waste material strength on an axis or axes that are not critical to the capacity of the bellows to hold pressure and exert force over the desired range of motion.

In some embodiments, therefore strength is perhaps about maximization of chemical bond strength in those directions that are optimal for a thin wall pressure vessel—exploiting anisotropic properties, and not wasting bond strength in non-desired directions (e.g., like in the direction of wall thickness). In some embodiments, it is also, in the plastic case, about aligning polymers for maximum strength, and not leaving them in a spaghetti-like state as in an injection molded/extruded/cast state. Note that bellows convolutions are a way of varying these same anisotropic properties through gross geometry while still using high strength aligned polymers, for example, adding compliance in the axial direction while maximizing strength in the hoop direction and axially along the convolution profile.

In some embodiments, flexibility is about increasing compliance in the desired axis of range of motion—allowing the bellows to extend and thereby do work. Generally, but not always, extending and "doing work" in any other axis than the one desired is undesirable.

In various embodiments, actuator motion is constrained using multiple different techniques, including adding a spine or linkage, flexure spine, or other stiff element to the fluidic actuator, connecting multiple fluidic actuators using a coupling element or other mechanism, or any other appropriate manner of constraint. In some embodiments, force is transferred and movement is defined through a linkage. In various embodiments, a linkage, flexible structure, spine, flexure spine, linkage, or membrane is used to convert either chamber movement or force into joint movement or force. In various embodiments, multiple chambers and either a linkage, flexure spine, spine, or a flexible structure are made from a single piece of material. In some embodiments, the constraining flexure elements comprise significantly elastomeric materials to enable a range of motion and are reinforced with flexible high strength fibers to enable great overall strength.

In various embodiments, configurations using 1, 2, 3, 4, or any other appropriate number of actuators are used for applications. In some embodiments, multiple chambers are placed antagonistically so that pressurized fluid is used to create opposing force and regulate force, position, or stiffness. In various embodiments, configurations include: 1 chamber forming a 1 degree of freedom actuator, using the internal force of the deformed chamber material to return it to a neutral position; 1 chamber forming a 1 degree of freedom actuator where the volume determines a shape or a joint movement; 2 chambers forming a 1 degree of freedom antagonistic actuator; 3 or more chambers forming a 2 degree of freedom antagonistic actuator; 4 chambers forming a 2 degree of freedom actuator with stiffness control; or any other appropriate configuration. In some embodiments, the geometry is turned to enable volume and pressure, and thereby work, to vary non-linearly with extension so as to enable non linear variable force actuation. For example, a blow molded actuator might be geometrically tuned to be very strong when bent but less strong when pointing straight.

In various embodiments, techniques exist for activation and control of a blow molded fluidic actuator. Fluid movement is generally facilitated by a compressed gas or pressurized liquid source. In various embodiments, the flow in and out of chambers is either directed by valves or by pumps, or any other appropriate flow control. In some embodiments, actuator position or force is controlled by sensing any combination of position, velocity, volume flow rate to/from each chamber, mass flow rate into and out of each chamber, and fluid properties in each chamber (e.g., temperature, pressure, volume), and determining control signals from the measured signals to close a feedback loop. In some embodiments, feedback computations are done either through analog hardware (e.g., electronics, mechanisms) or by using a digital computing system. For example, sensors in a feedback control loop comprise one or more of the following: pressure sensors, temperature sensors, flow sensors, volume sensors, vision sensors, Hall effect sensors, inclinometers, accelerometers, inertial measurement units, magnetometers, gyroscopes, interferometers, sonar sensor, reflective sensor, capacitive sensor, pressure transducers, thermocouples, thermistors, flex sensors. In various embodiments, specific geometries or linkages or flexure spines are constructed that enable position to be controlled solely based on pressure ratio, for instance by designing a nonlinear chamber volume to joint position relationship. In some embodiments, for actuators that enable position to be controlled solely based on pressure ratio, the actuators exhibit a special property where actuator stiffness is actively tuned either instead of or in addition to other controls.

The fluidic actuator comprises a chamber—for example, a sealed chamber for holding a fluid (e.g., a gas or a liquid). The chamber allows a volume change by bending (e.g., the internal volume of the sealed chamber changes as the chamber walls bend). The amount of fluid that is held by the scaled chamber changes as the walls bend. In some embodiments, changing the volume of fluid stored in the chamber causes the walls to bend. In some embodiments, the chamber comprises a bellows. In some embodiments, the bellows create deflection (e.g., bending). In some embodiments, the bellows comprise convolutions (e.g., folds, ridges, etc.). In some embodiments, in the event fluid is added to or removed from the chamber, one or more convolutions of the chamber deflect.

In some embodiments, the fluidic actuator comprises a bellows-based actuator including a novel use of convolutions to design elastic and non-elastic regions in a single, homogenous material instead of using multiple materials or complicated processing. A monolithic inexpensive process such as blow molding or injection molding is used for production of the fluidic actuator. In some embodiments, the fluidic actuator comprises convolutions in axial, radial, or both directions enabling the stiffness, accuracy, and overall range of motion to be tunable via geometry instead of solely from the key material properties (e.g., modulus of elasticity) and material thickness. In some embodiments, the fluidic actuator comprises deterministic position control based on antagonistic actuation, with either volume or pressure as the control using a fluidic medium such as liquid or air. Volume and pressure controlled systems have different geometries and requirements. The fluidic actuator is able to achieve a large range of motion (e.g., bending more than) 90° with high overall stiffness and high dimensional stability.

In some embodiments, the fluidic actuator comprises a stem bellows actuator. A stem bellows actuator comprises a stem shaped fluidic actuator capable of bending. In various embodiments, the stem bellows actuator comprises one chamber, two chambers, three chambers, four chambers, or any other appropriate number of chambers. In some embodiments, the chambers are configured antagonistically (e.g., the chambers push against one another in different directions). In some embodiments, the stem bellows actuator comprises a one degree of freedom actuator (e.g., the end of the actuator is capable of moving to a set of points on a curve or line). In some embodiments, the stem bellows actuator comprises a two degree of freedom actuator (e.g. the end of the actuator is capable of moving to a set of points on a surface—a flat or curved surface). In some embodiments, the stem bellows actuator comprises a three degree of freedom actuator (e.g. the end of the actuator is capable of moving to a set of points within a volume or the end of the actuator is capable of moving on a curved surface while twisting for the third degree of freedom).

In some embodiments, the fluidic actuator additionally comprises a spine, flexure spine, or a linkage (e.g., a member that can bend but not lengthen or contract, a constraint between the end points of the spine, flexure spine, or linkage, etc.). In various embodiments, the spine, flexure spine, or linkage is integrated with the chamber (e.g., formed as part of the chamber during the blow molding process) or connected to the chamber (e.g., formed separately from the chamber, potentially of a different material, and connected to the chamber in an assembly step). In some embodiments, the fluidic actuator comprises a variable stiffness actuator (e.g., a change in pressure within the chambers can cause the actuator stiffness to change).

FIG. 1 is a diagram illustrating a cross section of an embodiment of a fluidic actuator. In some embodiments, the fluidic actuator of FIG. 1 comprises a stem bellows actuator. In the example shown, chamber 100 comprises a one degree of freedom fluidic actuator shown in cross section. Chamber 100 in three dimensions comprises cross section shown in FIG. 1 rotated around the axis of symmetry. Chamber 100 comprises a fluid-tight chamber formed by a mass manufacturing process—for example, blow molding, injection molding, rotational molding, 3D printing, or extrusion. Chamber 100 comprises port 102. In some embodiments, port 102 comprises a port for allowing a fluid to pass into and out of chamber 100. In some embodiments, port 102 is connected to a fluid supply (e.g., a compressor, a pump, a tank, etc.). In some embodiments, one or more fluid control devices is/are present in between port 102 and the fluid supply (e.g., a regulator, a valve, etc.). In various embodiments, a fluid supply connected to chamber 100 via port 102 controls a volume of fluid in chamber 100, a pressure of fluid in chamber 100, a temperature of a fluid in chamber 100, or any other appropriate fluid property. In some embodiments, increasing the volume of fluid in chamber 100 causes the walls of chamber 100 to bend. The convolutions (e.g., folds) in the walls unfold in order to increase the internal volume of chamber 100 and the chamber expands. In some embodiments, a chamber incorporating convolutions comprises a bellows. In some embodiments, chamber 100 comprises a bellows. In some embodiments, convolutions bend to create deflection. In some embodiments, deflection allows a volume change. In some embodiments, the convolutions are designed so that the chamber expands in a straight line when the internal pressure is increased, moving end 104 away from port 102. In some embodiments, decreasing or increasing the volume of fluid in chamber 100 causes the walls of chamber 100 to bend. The convolutions (e.g., folds) in the walls fold more in order to decrease the internal volume of chamber 100 and the chamber contracts. In some embodiments, the convolutions are designed so that the chamber contracts in a straight line when the internal volume is decreased, moving end 104 towards port 102. In some embodiments, chamber 100 is designed to have a returning force (e.g., as in a spring) for returning chamber 100 to a neutral position. In some embodiments, chamber 100 is designed not to have a returning force and to remain in the position set by the pressure or volume of fluid present in chamber 100. In some embodiments, the convolutions of chamber 100 are designed so that chamber 100 expands and contracts in a straight line. In some embodiments, the convolutions of chamber 100 are designed to that chamber 100 curves as it expands and/or contracts. In various embodiments, chamber 100 is designed to curve as it expands and/or contracts using asymmetric convolutions, nonuniform convolutions, a region where convolutions are not present, nonuniform stiffness, a spine, a flexure spine, a linkage, or any other appropriate design feature. In some embodiments, the travel of chamber 100 as it expands and/or contracts is dictated by a mechanical restraint attached to chamber 100.

In some embodiments, chamber 100 is formed using from plastic using a blow molding process. In some embodiments, the plastic of chamber 100 comprises a thermoplastic. In various embodiments, the plastic of chamber 100 comprises polyethylene terephthalate, high density polyethylene, low density polyethylene, polypropylene, or any other appropriate plastic. In some embodiments, the blow molding process aligns polymer chains of the plastic. In various embodiments, aligning polymer chains of the plastic increases plastic strength, stiffness, elasticity, resistance to breakage, total lifetime, or any other appropriate parameter. In some embodiments, chamber 100 comprises a fluid impermeable layer (e.g., to hold fluid pressure within chamber 100) and a mechanically structural layer (e.g., to hold a desired shape). In some embodiments, a single material layer comprises both a fluid impermeable layer and a mechanically structural layer. In some embodiments, the fluid impermeable layer comprises an inner material layer (e.g., a fluid impermeable bladder) and the mechanically structural layer comprises an outer material layer (e.g., a fluid permeable but mechanically structural plastic layer). In some embodiments, fibers are added to the plastic of chamber 100 (e.g., to increase its strength). In some embodiments, fibers added to the plastic of chamber 100 are aligned in order to anisotropically increase its strength (e.g., to allow compliance the direction of expansion and contraction but increase strength in the perpendicular direction). In some embodiments, a fabric is added to chamber 100 (e.g., wrapped around chamber 100, glued to chamber 100) in order to increase its strength (e.g., isotropically or anisotropically). In some embodiments, chamber 100 is formed through a multiple step blow molding process (e.g., multiple blow molding steps are used to deposit multiple plastic layers). In various embodiments, plastic layers deposited during a multiple step blow molding process comprise a high strength plastic layer, a fluid impermeable plastic layer, a high elasticity plastic layer, a UV (e.g., ultraviolet light) impermeable plastic layer, a light reflective plastic layer, a light weight plastic layer, or any other appropriate plastic layer.

In some embodiments, an end effector is mounted on end 104. In various embodiments, an end effector comprises a mirror, a redirector, a reflector, an energy collector, or any other appropriate end effector.

Figure 2:
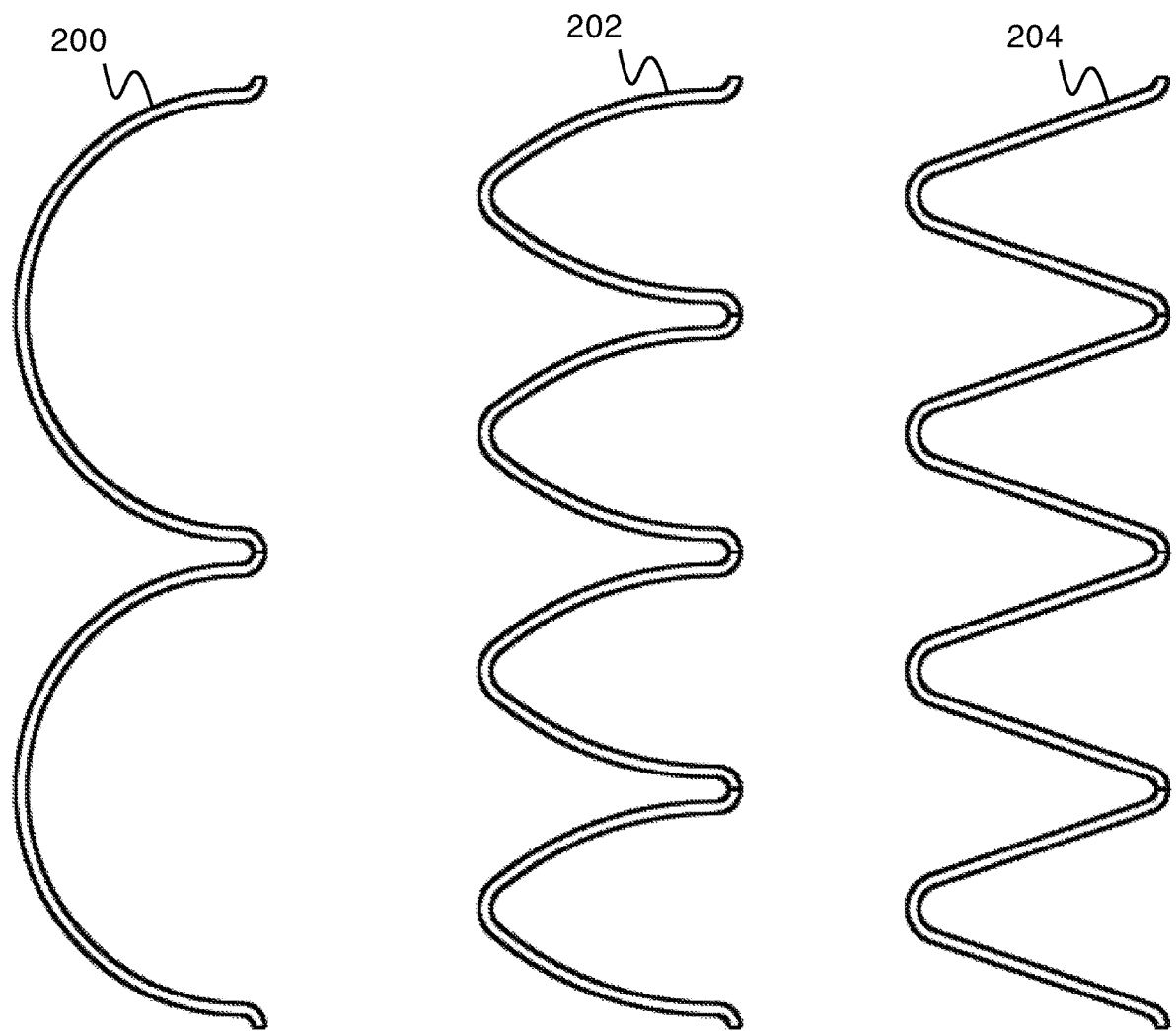
FIG. 2 is a diagram illustrating an embodiment of side wall convolutions in cross section.

FIG. 2 is a diagram illustrating an embodiment of side wall convolutions in cross section. In some embodiments, the convolutions of FIG. 2 comprise convolutions for a chamber (e.g., chamber 100 of FIG. 1) forming a bellows actuator. In the example shown, convolutions 200, convolutions 202, and convolutions 204 comprise geometries of a chamber wall (e.g., revolved to make a closed tube and repeated and for example sealed at one end with an opening at another end). Convolutions 200 comprises semicircular convolutions, convolutions 202 comprises composite waveform convolutions, and convolutions 204 comprises triangular convolutions. In various embodiments, convolutions are designed with various profiles in order to affect the bellows stiffness, elasticity, lifetime, returning force, or any other appropriate parameter. For example, composite waveform convolutions may be chosen such that internal stresses are evenly distributed throughout the material improving strength performance and while giving up range of motion. On the other hand, a triangle wave gives the maximum range of motion but at the cost of strength. Semicircular and composite waveform convolutions may be chosen such that neighboring convolutions come in contact altering the stiffness and active cross section of the fluidic actuator. In some embodiments, convolutions are spaced with sections of cylindrical tubing. In some embodiments, convolutions are spaced with sections of cylindrical tubing.

In some embodiments, a convolution profile should be designed so as to meet range of motion requirements while as closely as possible approximating an optimal thin wall pressure vessel. That is, material should ideally be operated in tension at consistent stress levels, independent of whether it is a hoop or axial stress, or in which section of the convolution the stress is. Variable wall thickness and anisotropic properties of the material might further be tuned to aid in this, for example, blow molding might stretch the preform in hoop more than axial so as through polymer alignment to increase strength in hoop and increase compliance in the axial direction, though a trade off between optimal stress levels and range of motion will ensue.

Figure 3:
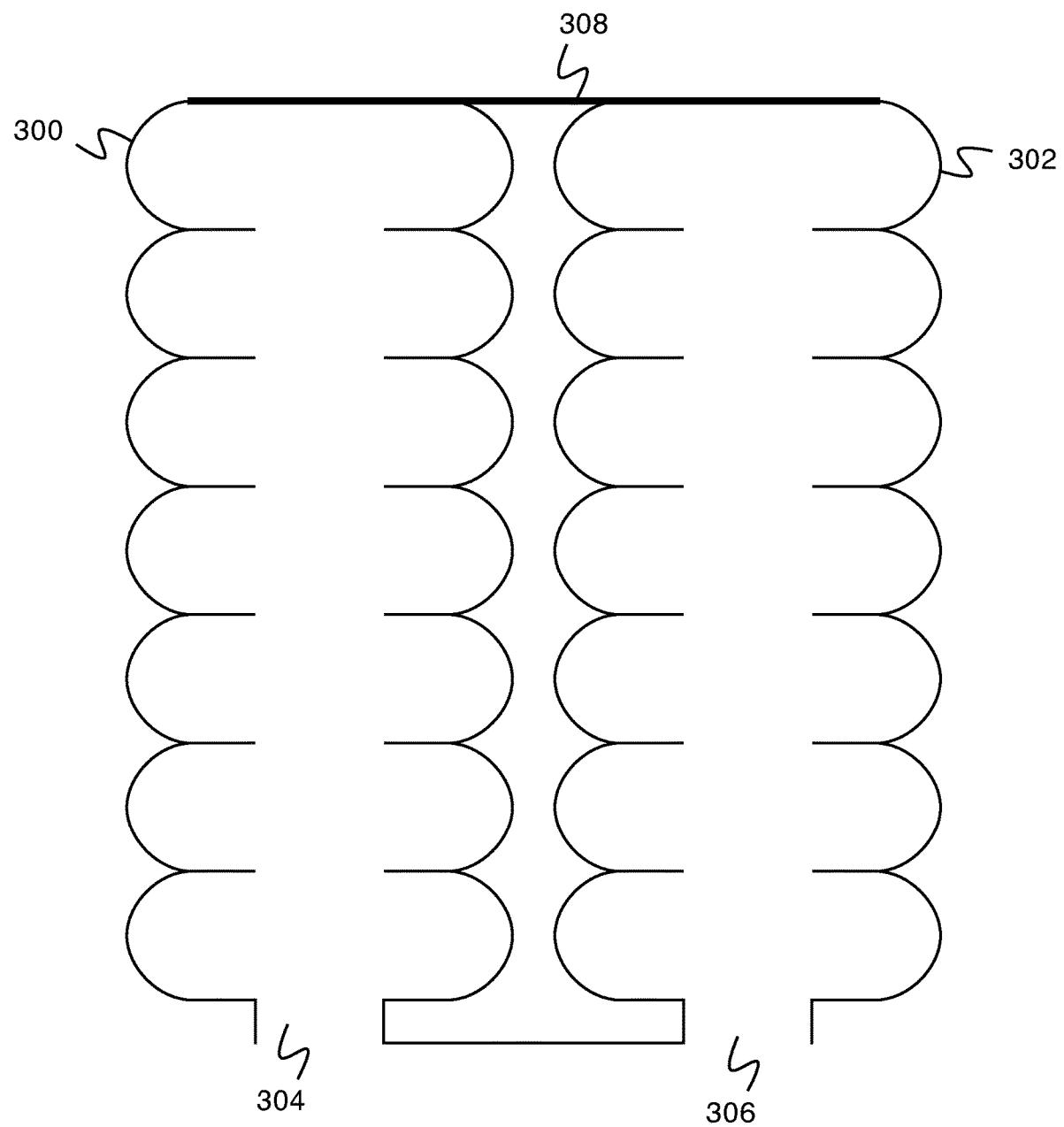
FIG. 3 is a diagram illustrating a cross section of an embodiment of a fluidic actuator.

FIG. 3 is a diagram illustrating a cross section of an embodiment of a fluidic actuator. In some embodiments, the fluidic actuator of FIG. 3 comprises a stem bellows actuator. In the example shown, each of chamber 300 and chamber 302 comprises a one degree of freedom fluidic actuator (e.g., as in chamber 100 of FIG. 1). The combination of chamber 300 and chamber 302 comprises a two degree of freedom fluidic actuator. Port 304 comprises a port for allowing fluid to enter or exit chamber 300, and port 306 comprises a port for allowing fluid to enter or exit chamber 302. Flexure spine 308 comprises a flexure spine for connecting the ends of chamber 300 and chamber 302. In some embodiments, chamber 300 and chamber 302 expand and contract in response to changes in the pressure and/or volume of stored fluid (e.g., fluid entering and exiting chamber 300 via port 304 and chamber 302 via port 306). In some embodiments, if the volumes of the fluid contained in chamber 300 and the fluid contained in chamber 302 change in the same direction (e.g., in common mode), the end of the actuator (e.g., flexure spine 308) moves straight in and out (e.g., motion similar to the motion of chamber 100 of FIG. 1). In some embodiments, if the volumes of the fluid contained in chamber 300 and the fluid contained in chamber 302 change in opposite directions (e.g., in differential mode), the end of the actuator (e.g., flexure spine 308) tilts as the actuator bends to the right or left. In some embodiments, if the volume in chamber 300 is increased and the volume in chamber 302 is decreased, the actuator bends to the right. In some embodiments, if the volume in chamber 300 is decreased and the volume in chamber 302 is increased, the actuator bends to the left. In some embodiments, a combination of common mode volume changes and differential mode volume changes is used to move the end of the actuator within the plane of the two chambers (e.g., in two dimensions). In some embodiments, an end effector is mounted on flexure spine 308.

Figure 4:
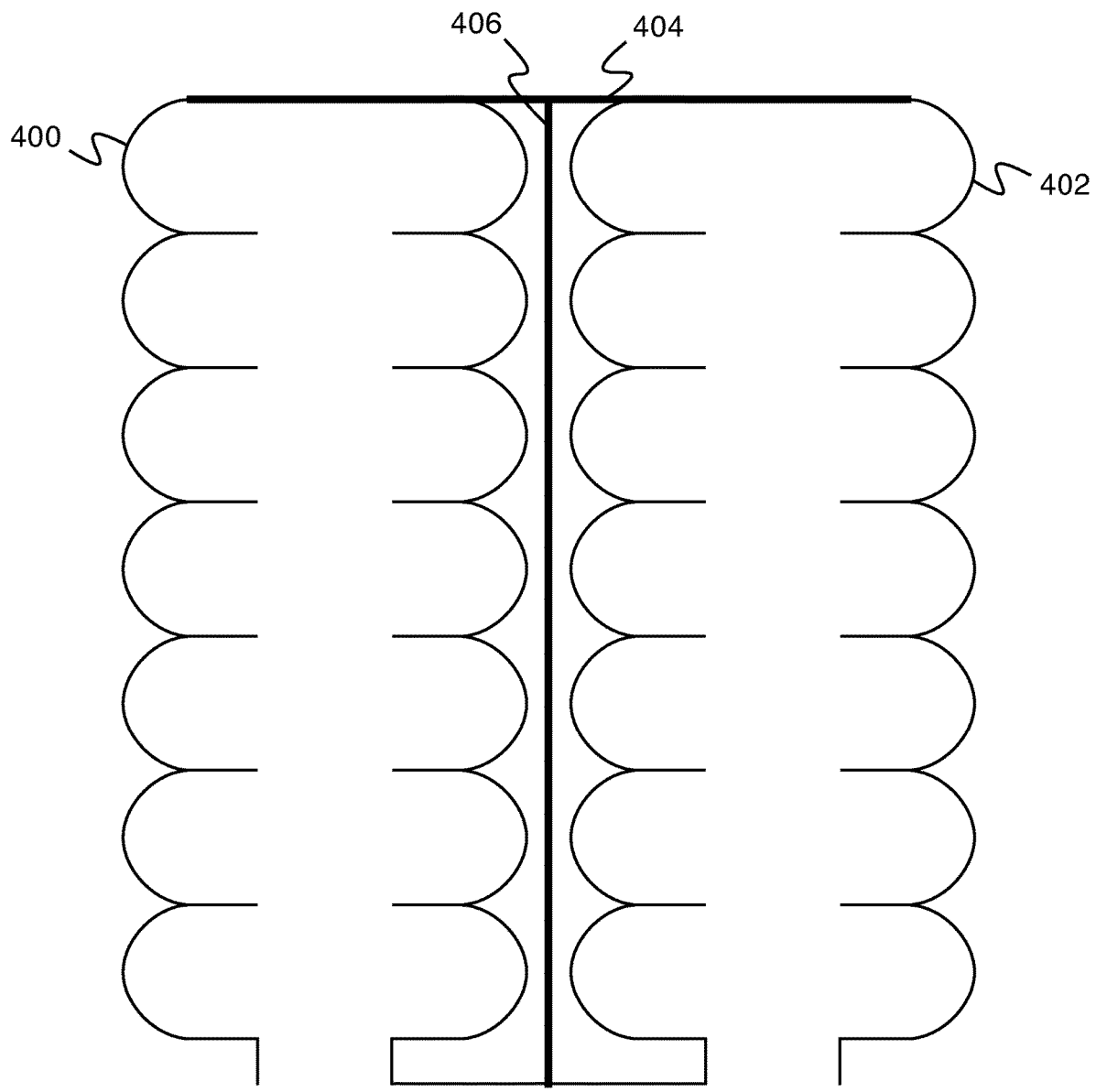
FIG. 4 is a diagram illustrating a cross section of an embodiment of a fluidic actuator.

FIG. 4 is a diagram illustrating a cross section of an embodiment of a fluidic actuator. In some embodiments, the fluidic actuator of FIG. 4 comprises a stem bellows actuator. In the example shown, each of chamber 400 and chamber 402 comprises a one degree of freedom fluidic actuator (e.g., as in chamber 100 of FIG. 1). In some embodiments, the combination of chamber 400 and chamber 402 comprises a one degree of freedom stem bellows actuator. Chamber 400 and chamber 402 are connected via linkage 404 and stem 406. Stem 406 comprises a stem or flexure spine capable of bending but not extending or contracting. In the event that the internal volume of chamber 400 and the internal volume of chamber 402 change in opposite directions (e.g., in differential mode), stem 406 bends, allowing the actuator to bend to the left or to the right. In the event that the internal pressure of chamber 400 and the internal pressure of chamber 402 change in opposite directions (e.g., in differential mode), the torque applied by the actuator will change, in some cases causing the actuator to bend to the left or to the right. In the event that the internal pressure of chamber 400 and the internal pressure of chamber 402 change in the same direction (e.g., in common mode), stem 406 prevents the actuator from extending or contracting. In some embodiments, in the event that the actuator is unloaded and at rest and the internal pressure of chamber 400 and the internal pressure of chamber 402 change in the same direction while maintaining a constant pressure ratio, the stiffness of the actuator changes (e.g., becomes stiffer or becomes more compliant) while the unloaded equilibrium position does not change. In some embodiments, the ratio of the internal pressure of chamber 400 and the internal pressure of chamber 402 determine a unique unloaded equilibrium position. In some embodiments, the constrained motion of the actuator is along a single curved line (e.g., in one dimension). In some embodiments, an end effector is mounted on linkage 404.

Figure 5:
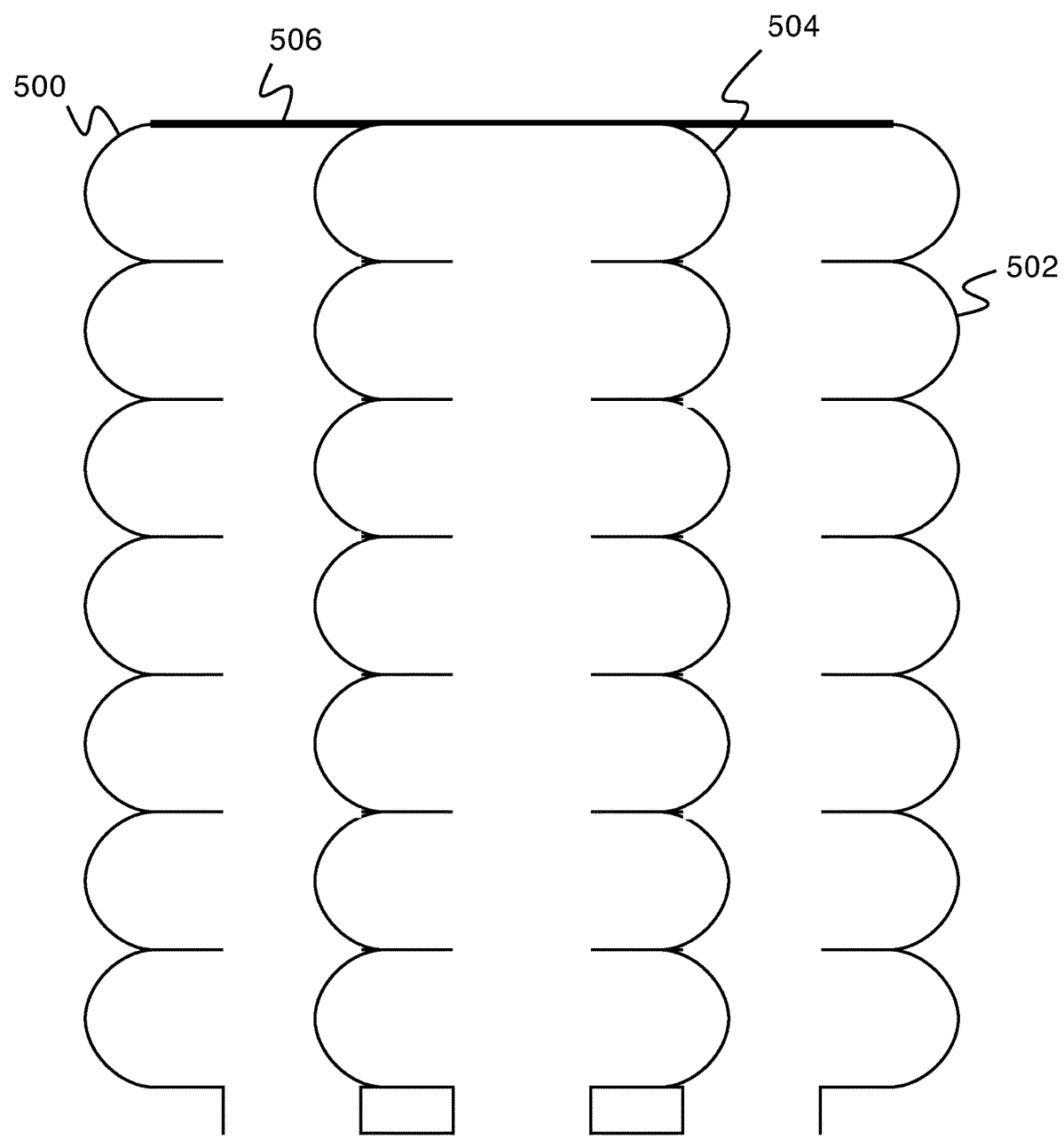
FIG. 5 is a diagram illustrating a side view of an embodiment of a fluidic actuator.

FIG. 5 is a diagram illustrating a side view of an embodiment of a fluidic actuator. In some embodiments, the fluidic actuator of FIG. 5 comprises a stem bellows actuator. In the example shown, each of chamber 500, chamber 502, and chamber 504 comprises a one degree of freedom fluidic actuator (e.g., as in chamber 100 of FIG. 1). In some embodiments, the combination of chamber 500, chamber 502, and chamber 504 comprises a three degree of freedom stem bellows actuator. In the example shown, chamber 500, chamber 502, and chamber 504 are connected via linkage 506. The central axes of chamber 500, chamber 502, and chamber 504 are located equidistant from one another (e.g., chamber 500, chamber 502, and chamber 504 form a triangle when viewed from above). In some embodiments, if the volumes of the fluid contained in chamber 500, the fluid contained in chamber 502, and the fluid contained in chamber 504 change in the same direction (e.g., in common mode), the end of the actuator (e.g., linkage 506) moves straight in and out (e.g., motion similar to the motion of chamber 100 of FIG. 1). In some embodiments, if the volumes of the fluid contained in any two of chamber 500, chamber 502, and chamber 504 change in opposite directions (e.g., in differential mode), the end of the actuator (e.g., linkage 506) tilts as the actuator bends (e.g., similar to the bending of the actuator of FIG. 3). The stem actuator is capable of bending in six different directions (e.g., two directions for each of three separate pairs of chambers). In some embodiments, a combination of common mode volume changes and differential mode volume changes is used to move the end of the actuator in three dimensions. In some embodiments, an end effector is mounted on linkage 506. Each of the chambers (e.g., chamber 500, chamber 502, and chamber 504) includes an opening for moving fluid in and out of each of the chambers.

Figure 6:
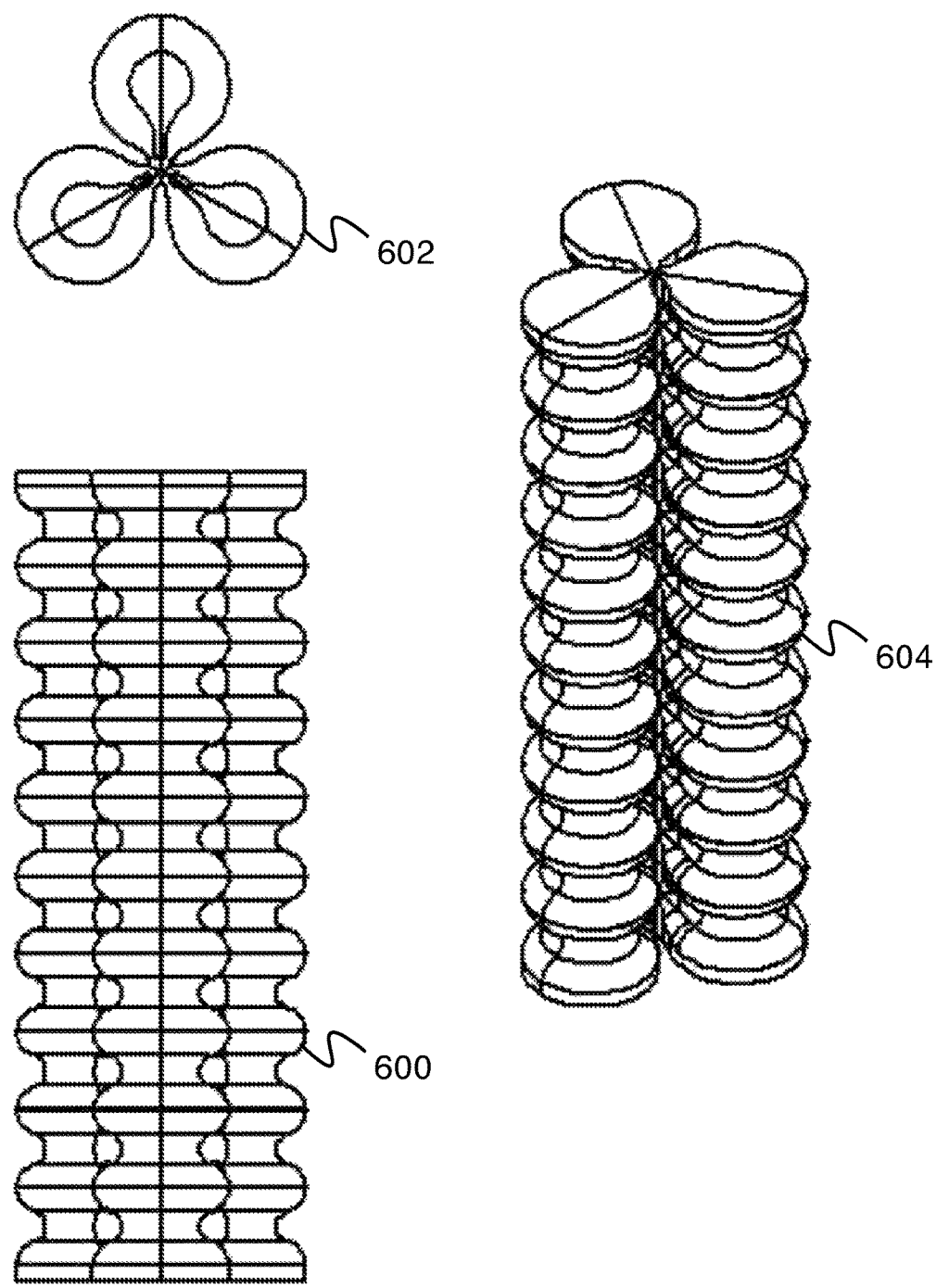
FIG. 6 is a diagram illustrating three views of a fluidic actuator.

FIG. 6 is a diagram illustrating three views of a fluidic actuator. In some embodiments, the fluidic actuator shown in FIG. 6 comprises the fluidic actuator of FIG. 5. In the example shown, fluidic actuator 600 comprises a fluidic actuator comprising three chambers shown from the front. Fluidic actuator 602 comprises a fluidic actuator comprising three chambers shown from the top. Fluidic actuator 604 comprises a fluidic actuator comprising three chambers shown in an isometric view. In some embodiments the bellows actuator in 600 is entirely formed out of a single continuous piece of material.

Figure 7:
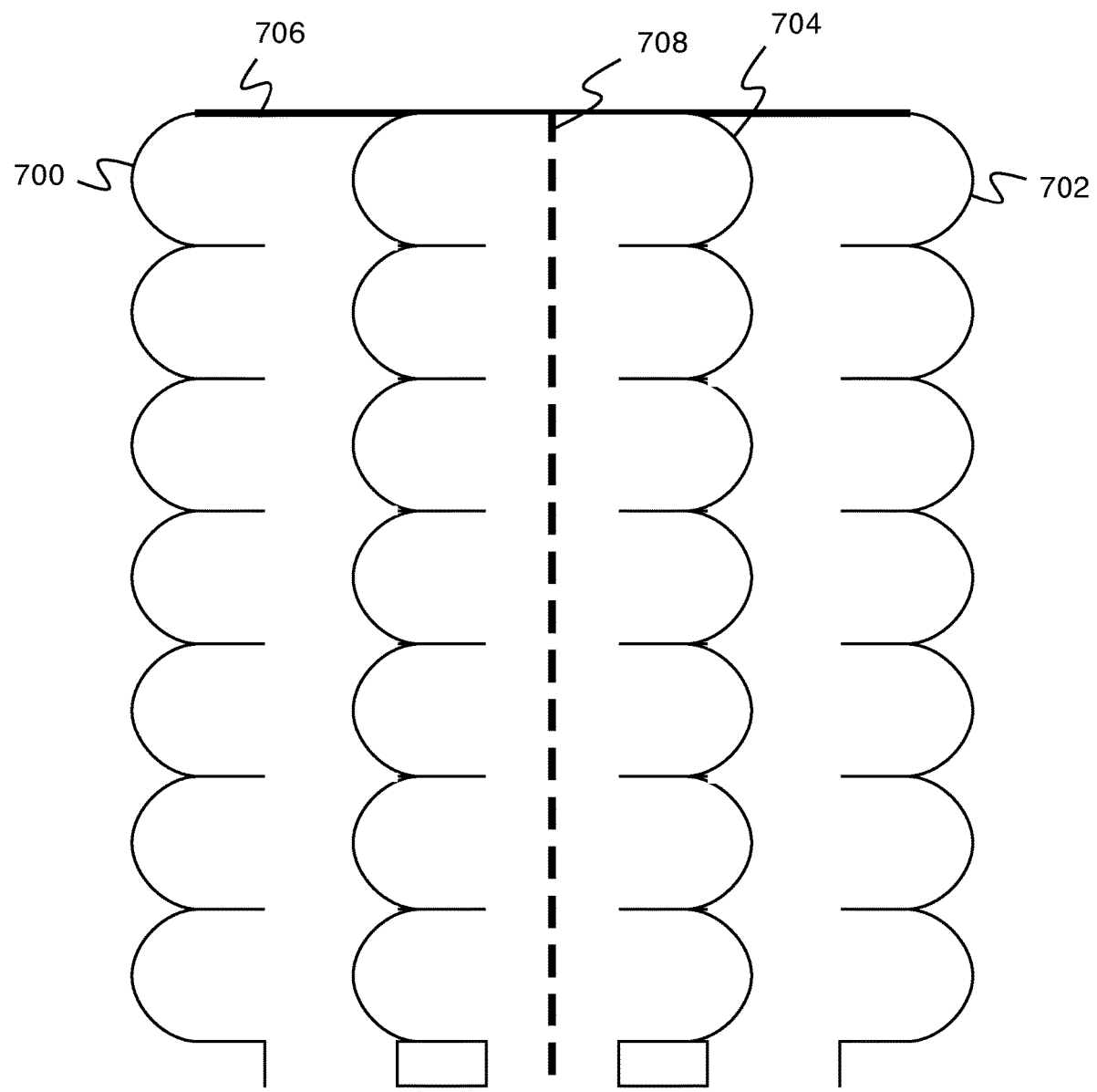
FIG. 7 is a diagram illustrating a side view of an embodiment of a fluidic actuator.

FIG. 7 is a diagram illustrating a side view of an embodiment of a fluidic actuator. In some embodiments, the fluidic actuator of FIG. 7 comprises a stem bellows actuator. In the example shown, each of chamber 700, chamber 702, and chamber 704 comprises a one degree of freedom fluidic actuator (e.g., as in chamber 100 of FIG. 1). In some embodiments, the combination of chamber 700, chamber 702, and chamber 704 comprises a two degree of freedom stem bellows actuator. In the example shown, chamber 700, chamber 702, and chamber 704 are connected via linkage 706 and stem 708. In some embodiments, stem 708 comprises a stem or flexure spine capable of bending but not extending or contracting. In some embodiments, if the internal volume of the fluid contained in any two of chamber 700, chamber 702, and chamber 704 change in opposite directions (e.g., in differential mode), the actuator will bend (e.g., similar to the bending of the actuator of FIG. 3). In some embodiments, if the internal pressure of the fluid contained in any two of chamber 700, chamber 702, and chamber 704 change in opposite directions (e.g., in differential mode), the torque applied by the actuator will change, in some cases causing the actuator to bend flexure spine (e.g., similar to the bending of the actuator of FIG. 3). In the event that the internal pressure of chamber 700, the internal pressure of chamber 702, and the internal pressure of chamber 704 change in the same direction (e.g., in common mode), stem 708 prevents the actuator from extending or contracting. In some embodiments, in the event that the internal pressure of chamber 700, the internal pressure of chamber 702, and the internal pressure of chamber 704 change in the same direction while maintaining a constant pressure ratio, the stiffness of the actuator changes. In some embodiments, the ratio of internal pressures determines a unique unloaded equilibrium position. In some embodiments, the constrained motion of the actuator is along a single curved surface (e.g., in two dimensions). In some embodiments, an end effector is mounted on linkage 706.

Figure 8:
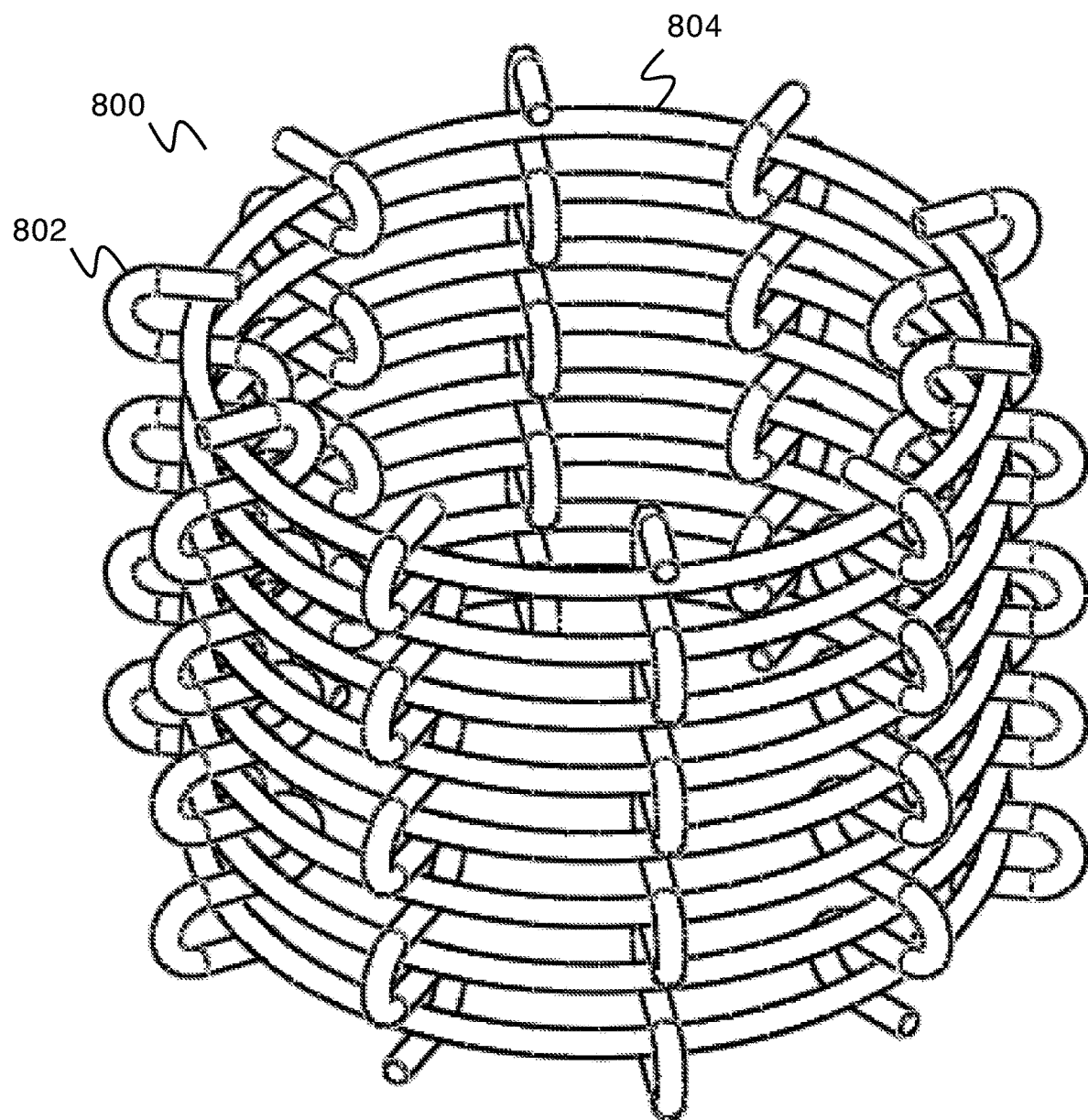
FIG. 8 is a diagram illustrating an embodiment of a fabric.

FIG. 8 is a diagram illustrating an embodiment of a fabric. In some embodiments, fabric 800 is used in conjunction with a fluid-tight chamber (e.g., chamber 100 of FIG. 1). In some embodiments, fabric 800 is fastened to the outside of a fluid-tight chamber. In the example shown, fabric 800 of FIG. 8 comprises a set of fibers. The fibers comprise axial fibers (e.g., fiber 802) and circumferential fibers (e.g., fiber 804). The axial fibers, as shown, are able to straighten as the fabric expands in an axial direction (e.g., as chamber 100 of FIG. 1 extends). The circumferential fibers constrain the fabric circumference, preventing an included chamber from expanding circumferentially. In some embodiments, the motion of the included chamber as pressure increases is guided by fabric 800. In various embodiments, the fabric is designed to guide an included chamber to bend as volume increases, to stop increasing at a given length, to expand into a sphere, an ellipsoid, or other desired shape, or to expand in any other appropriate way as volume increases.

In some embodiments, a fluidic actuator comprises a rolling bellows actuator. A rolling bellows actuator comprises a fluidic actuator configuration capable of changing the angle of a effector. In some embodiments, a rolling bellows actuator comprises a one-degree of freedom actuator (e.g., the flat surface effector rotates about a line). In some embodiments, a rolling bellows actuator comprises a two degree of freedom actuator (e.g., the flat surface effector rotates about a point). In various embodiments, the effector comprises one or more of the following: a reflector, redirector, an optical concentrator, a spectrum-splitting device, a photovoltaic, a heat collector, or any other appropriate end-effector.

Figure 9:
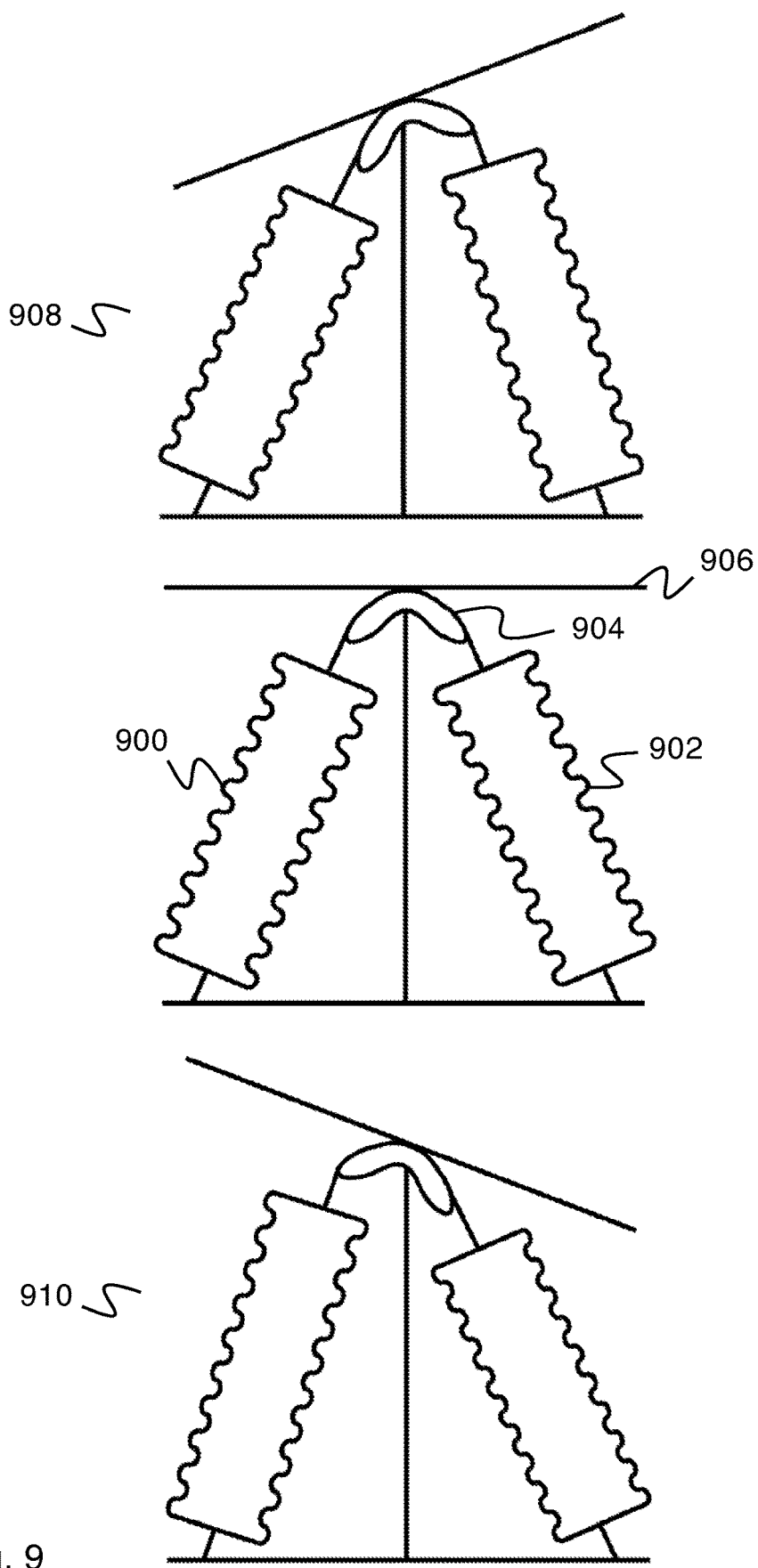
FIG. 9 is a diagram illustrating cross section views of three positions of a rolling fluidic actuator.

FIG. 9 is a diagram illustrating cross section views of three positions of a rolling fluidic actuator. In the example shown, each of chamber 900 and chamber 902 comprises a one degree of freedom stem bellows actuator (e.g., as in chamber 100 of FIG. 1). Chamber 900 and chamber 902 are connected via flexure spines to cam 904. Effector 906 is mounted on cam 904. If the volume of chamber 900 and the volume of chamber 902 change in opposite directions, cam 904 rotates and effector 906 tilts. If the pressure of chamber 900 and the pressure of chamber 902 change in opposite directions, the torque applied to effector 906. In some embodiments, if the pressure of chamber 900 and the pressure of chamber 902 change in the same direction, cam 904 and effector 906 while maintaining a constant pressure ratio, the actuator stiffness increases (e.g., the external force necessary to move effector 906 increases). Actuator 908 comprises a rolling fluidic actuator actuated to tilt its effector to the left. Actuator 910 comprises a rolling fluidic actuator actuated to tilt its effector to the right. In some embodiments, the ration of internal pressures determines a unique unloaded equilibrium position.

Figure 10:
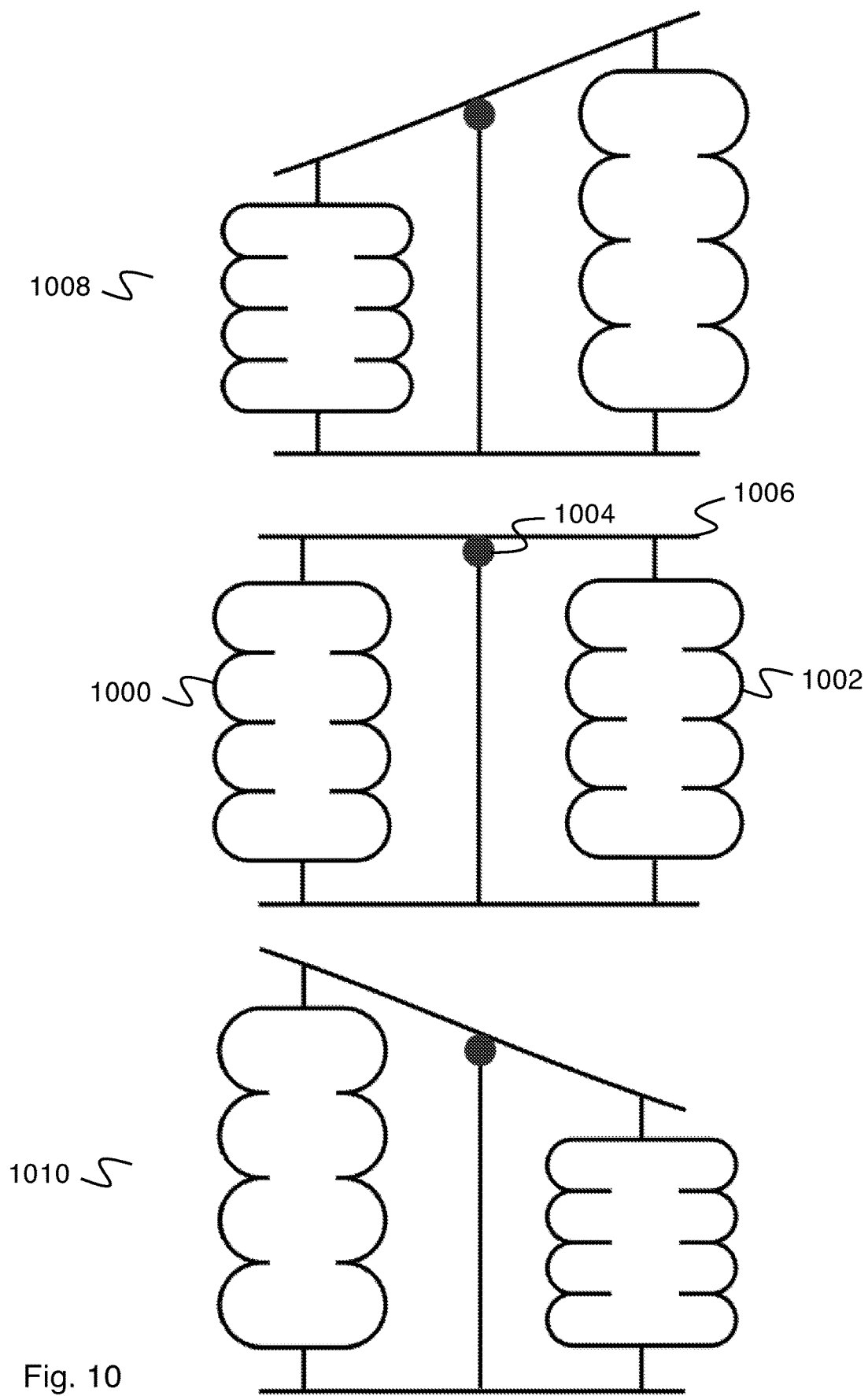
FIG. 10 is a diagram illustrating cross section views of three positions of a rolling fluidic actuator.

FIG. 10 is a diagram illustrating cross section views of three positions of a rolling fluidic actuator. In the example shown, each of chamber 1000 and chamber 1002 comprises a one degree of freedom stem fluidic actuator (e.g., as in chamber 100 of FIG. 1). Chamber 1000 and chamber 1002 are connected to effector 1006. Effector 1006 is mounted on pivot 1004. If the volume of chamber 1000 and the volume of chamber 1002 change in opposite directions, pivot 1004 rotates and effector 1006 tilts. If the pressure of chamber 1000 and the pressure of chamber 1002 change in opposite directions, the torque applied by the actuator to effector 1006 changes. In some embodiments, if the pressure of chamber 1000 and the pressure of chamber 1002 change in the same direction while maintaining a constant pressure ratio, pivot 1004 and effector 1006, the actuator stiffness increases (e.g., the external force necessary to move effector 1006 increases). Actuator 1008 comprises a rolling fluidic actuator actuated to tilt its effector to the left. Actuator 1010 comprises a rolling fluidic actuator actuated to tilt its effector to the right.

Figure 11:
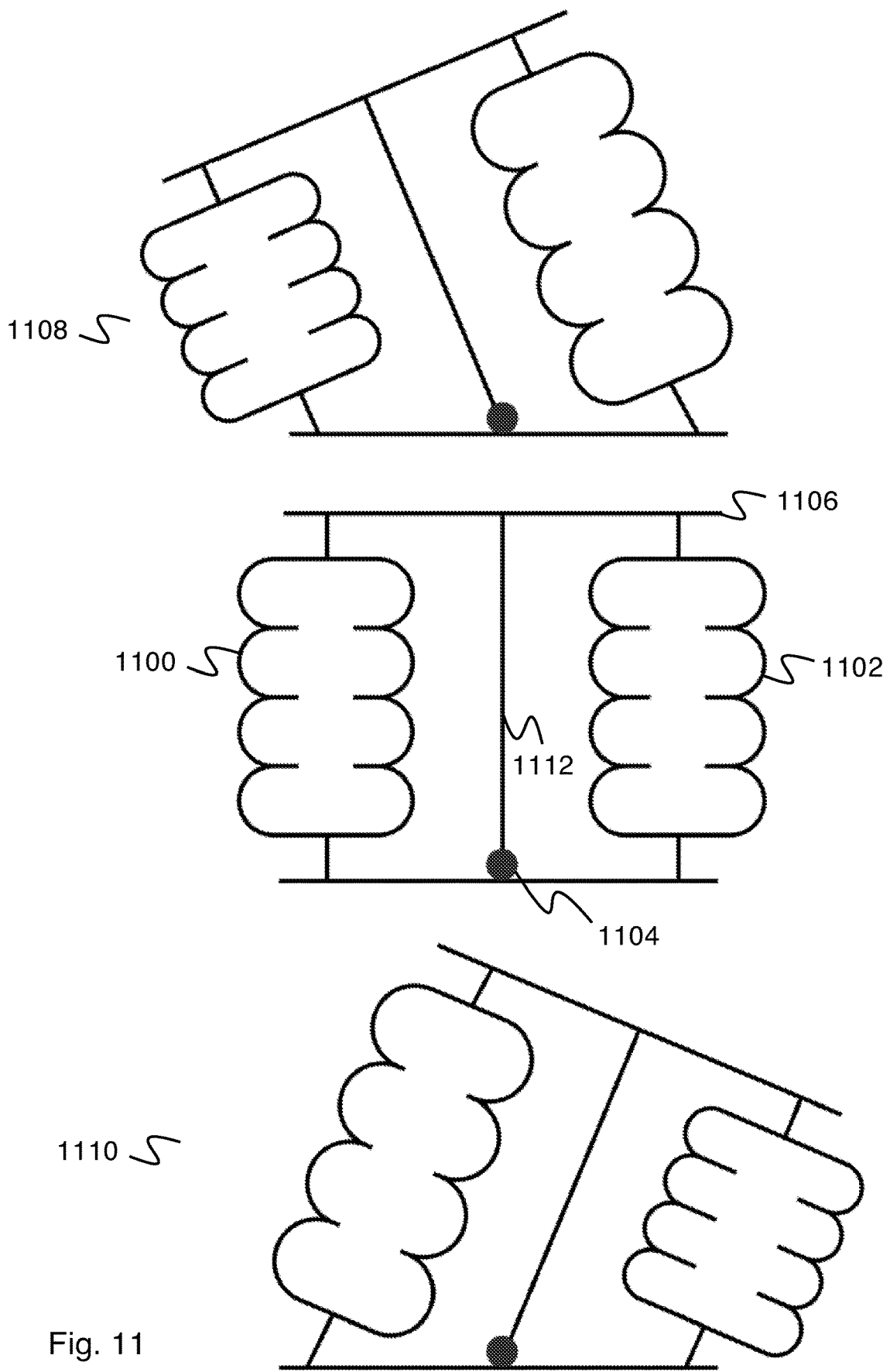
FIG. 11 is a diagram illustrating cross section views of three positions of a rolling fluidic actuator.

FIG. 11 is a diagram illustrating cross section views of three positions of a rolling fluidic actuator. In the example shown, each of chamber 1100 and chamber 1102 comprises a one degree of freedom stem fluidic actuator (e.g., as in chamber 100 of FIG. 1). Chamber 1100 and chamber 1102 are connected to effector 1106. Effector 1106 is connected to pivot 1104 via flexure spine 1112. If the volume of chamber 1100 and the volume of chamber 1102 change in opposite directions, pivot 1104 rotates, causing flexure spine 1112 and effector 1106 to tilt. If the pressure of chamber 1100 and the pressure of chamber 1102 change in opposite directions, the torque applied by the actuator to effector 1106 changes. In some embodiments, if the pressure of chamber 1100 and the pressure of chamber 1102 change in the same direction while maintaining the same pressure ratio, pivot 1104, flexure spine 1112, and effector 1106, the actuator stiffness increases (e.g., the external force necessary to move effector 1106 increases). Actuator 1108 comprises a rolling fluidic actuator actuated to tilt its effector to the left. Actuator 1110 comprises a rolling fluidic actuator actuated to tilt its effector to the right.

Figure 12A:
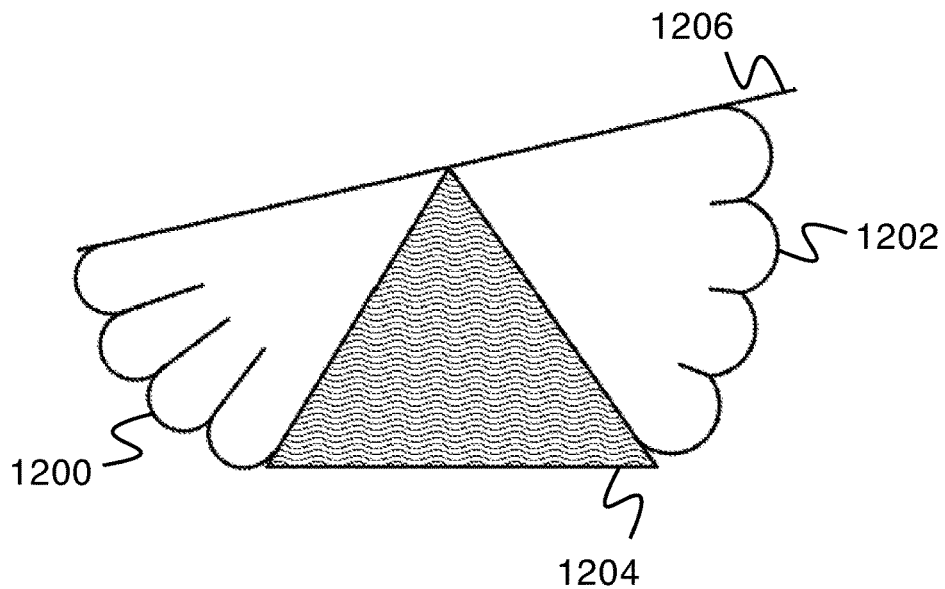
FIG. 12A is a diagram illustrating a side cross section view of rolling fluidic actuator.
Figure 12B:
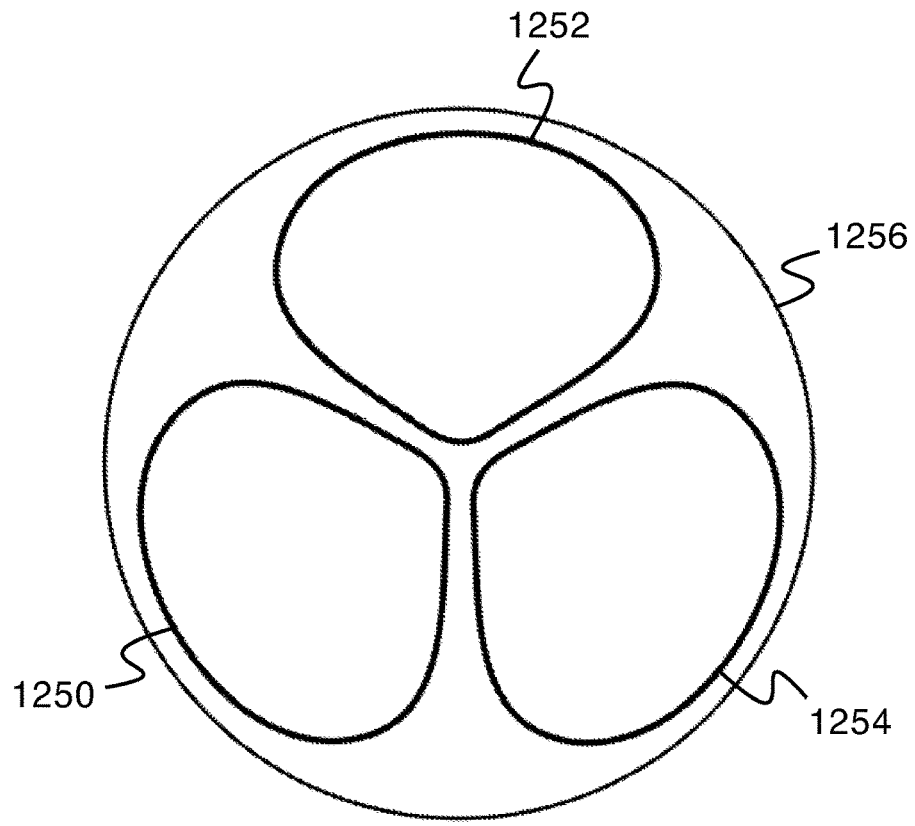
FIG. 12B is a diagram illustrating a top cross section view rolling fluidic actuator.

FIG. 12A is a diagram illustrating a side cross section view of rolling fluidic actuator. In the example shown, each of chamber 1200 and chamber 1202 comprises a chamber. In some embodiments, each of chamber 1200 and chamber 1202 comprise a bulbous chamber. In some embodiments, each of chamber 1200 and chamber 1202 comprises a wedge-shaped chamber that increase in size (e.g., the angular size of the wedge) when inflated. Chamber 1202 comprises a wedge-shaped chamber inflated to a greater degree than chamber 1200. Chamber 1200 and chamber 1202 are mounted to triangular pivot 1204. Effector 1206 is mounted to triangular pivot 1204 and attached to chamber 1200 and chamber 1202. If the volume of chamber 1200 and the volume of chamber 1202 change in opposite directions, effector 1206 tilts on triangular pivot 1204. If the pressure of chamber 1200 and the pressure of chamber 1202 change in opposite directions, the torque applied to effector 1206 changes. In some embodiments, if the pressure of chamber 1200 and the pressure of chamber 1202 both increase while maintaining a constant pressure ratio, the actuator stiffness increases (e.g., the external force necessary to move effector 1206 increases). FIG. 12B is a diagram illustrating a top cross section view rolling fluidic actuator. FIG. 12B illustrates a rolling fluidic actuator in top-down view. In the example shown, each of chamber 1250, chamber 1252, and 1254 comprises a chamber (e.g., a chamber as in chamber 1200 of FIG. 12A). Effector 1256 is attached to chamber 1250, chamber 1252, and chamber 1254. Effector 1256 is additionally mounted on a triangular pivot (e.g., a triangular pivot as in triangular pivot 1204 of FIG. 12A). The triangular pivot comprises a cone (e.g., the shape made by rotating triangular pivot 1204 of FIG. 12A about its vertical center line) contacting effector 1256 at its center point. Effector 1256 can be adjusted to any appropriate angle in two dimensions (e.g. rotated about a horizontal line or rotated about a vertical line) by changing the volume of chamber 1250, chamber 1252, and chamber 1254. In some embodiments, the rolling fluidic actuator of FIG. 12B comprises four chambers (e.g., dividing effector 1256 into quarters rather than thirds).

In some embodiments, in the event fluid is added to or removed from the chamber, one or more convolutions of the chamber deflect causing a change in orientation between the top and bottom couplers. Convolutions of the chamber comprise folds or ridges that allow deflection. Convolutions can be designed in many different possible ways. In some embodiments, convolutions comprise radial convolutions—for example, loops formed around the chamber in the shape of a semicircle in cross-section. In some embodiments, convolutions comprise longitudinal convolutions—for example, vertical folds running the length of the chamber. In some embodiments, convolutions comprise uniform convolutions—for example, stacked opposing semicircles of equal radius. In some embodiments, convolutions comprise non-uniform convolutions—for example, stacked opposing semicircles of unequal radius, changing along the length of the chamber. In some embodiments, convolutions comprise secondary convolutions, for example, small longitudinal convolutions running along a radial convolution, or small radial convolutions along a longitudinal convolution to relieve material strain (and therefore stress) in sections where complicated coupling exists. In some embodiments, convolutions comprise discontinuous convolutions—for example, a discontinuity where no convolutions are present exists between two regions of convolutions along the chamber. In some embodiments, convolutions comprise asymmetric convolutions—for example, radial convolutions that change shape or size around the radius of the chamber.

Figure 13:
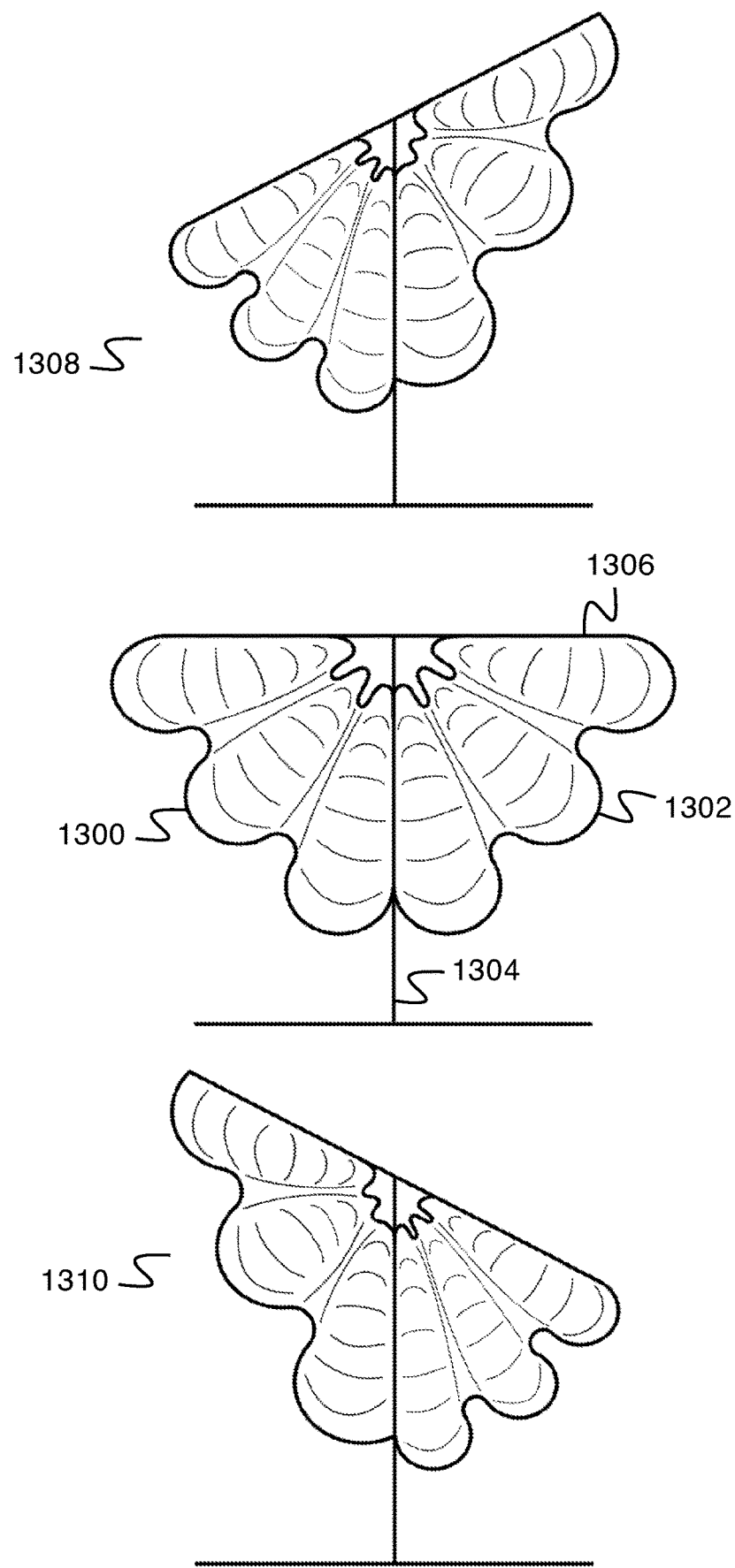
FIG. 13 is a diagram illustrating side views of three positions of a multiconvolution rolling fluidic actuator.

FIG. 13 is a diagram illustrating side views of three positions of a multiconvolution rolling fluidic actuator. In some embodiments, each of chamber 1300 and chamber 1302 comprise a bulbous chamber. In some embodiments, each of chamber 1300 and chamber 1302 comprises a wedge-shaped chamber that increase in size (e.g., the angular size of the wedge) when inflated.

In the example shown, chamber 1300 and chamber 1302 comprise multiple convolution chambers (e.g., chambers with multiple degrees of convolutions). Major level convolutions are present opposite the direction of extension (e.g., the chambers extend in an angular direction—increasing or decreasing the angle between effector 1306 and flexure spine 1304, and the major convolutions are in a radial direction), and smaller minor level convolutions are present opposite the direction of the major level convolutions. In some embodiments, the major level convolutions serve to increase compliance (e.g., reduce stiffness) of the chamber, and the minor level convolutions serve to increase compliance of the major level convolutions.

Chamber 1300 and chamber 1302 are connected to effector 1306. Effector 1306 is connected to flexure spine 1304 at a pivot point. If the volume of chamber 1300 and the volume of chamber 1302 change in opposite directions, the pivot point rotates, causing effector 1306 to tilt. If the pressure of chamber 1300 and the pressure of chamber 1302 change in opposite directions, the torque applied to effector 1306 changes. In some embodiments, if the pressure of chamber 1300 and the pressure of chamber 1302 change in the same direction while maintaining a constant pressure ratio, the actuator stiffness increases (e.g., the external force necessary to move effector 1306 increases). Actuator 1308 comprises a rolling fluidic actuator actuated to tilt its effector to the left. Actuator 1310 comprises a rolling fluidic actuator actuated to tilt its effector to the right.

Figure 14:
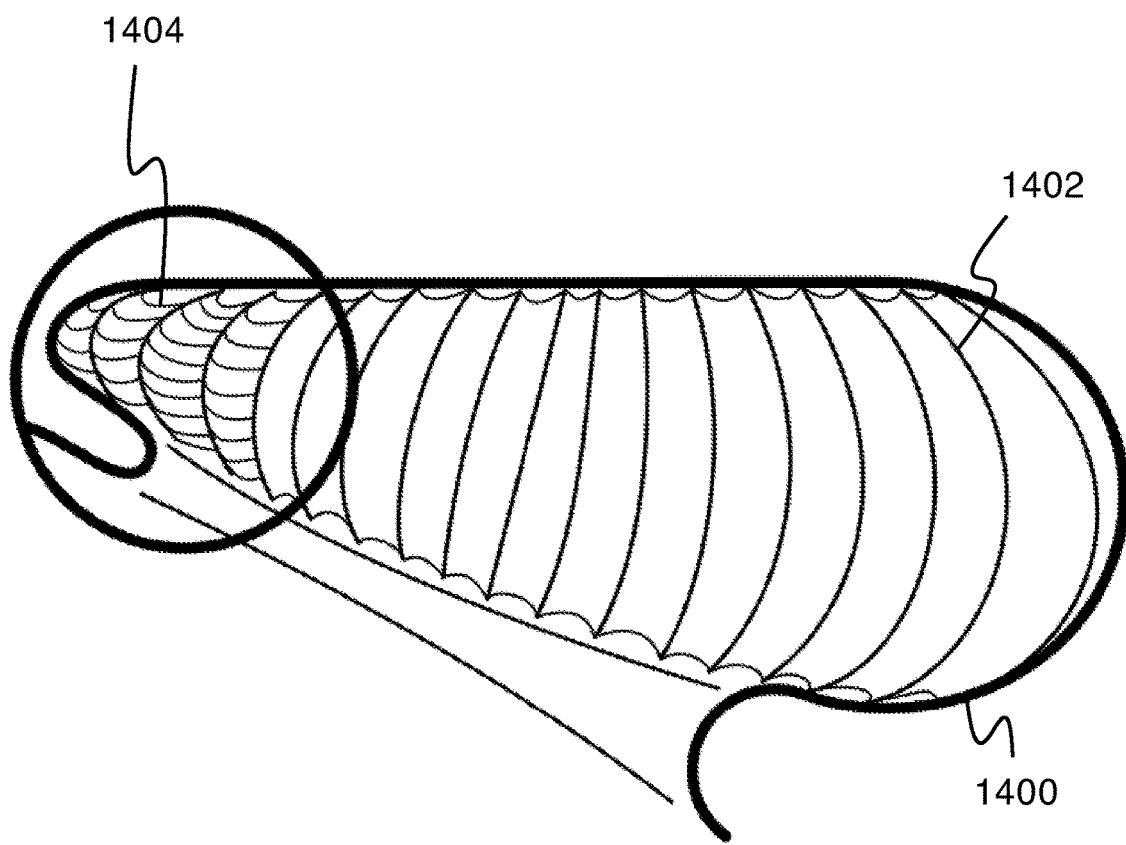
FIG. 14 is a diagram illustrating a side view of an embodiment of a portion of a chamber with multiple levels of convolutions.

FIG. 14 is a diagram illustrating a side view of an embodiment of a portion of a chamber with multiple levels of convolutions. In some embodiments, the portion of a chamber comprises a portion of a chamber used in a multiconvolution actuator (e.g., the multiconvolution actuator of FIG. 13). In the example shown, the portion of a chamber comprises three levels of convolutions. A first level of convolutions (e.g., convolution 1400) comprises convolutions for allowing the chamber to expand or contract. A second level of convolutions (e.g., convolution 1402) comprises convolutions for increasing the compliance of the first level of convolutions. A third level of convolutions (e.g., convolution 1404) comprise convolutions for increasing the compliance of the second level of convolutions. In some embodiments, multiple convolutions are about increasing compliance so as to mitigate high strain to accommodate large variations in outer diameter of a chamber. In some embodiments, using multiple convolutions enables the use of a rigid plastic to achieve large range of motion. In some embodiments, secondary convolutions must be small compared to primary convolutions to maintain flexibility of the primary convolutions.

Figure 15:
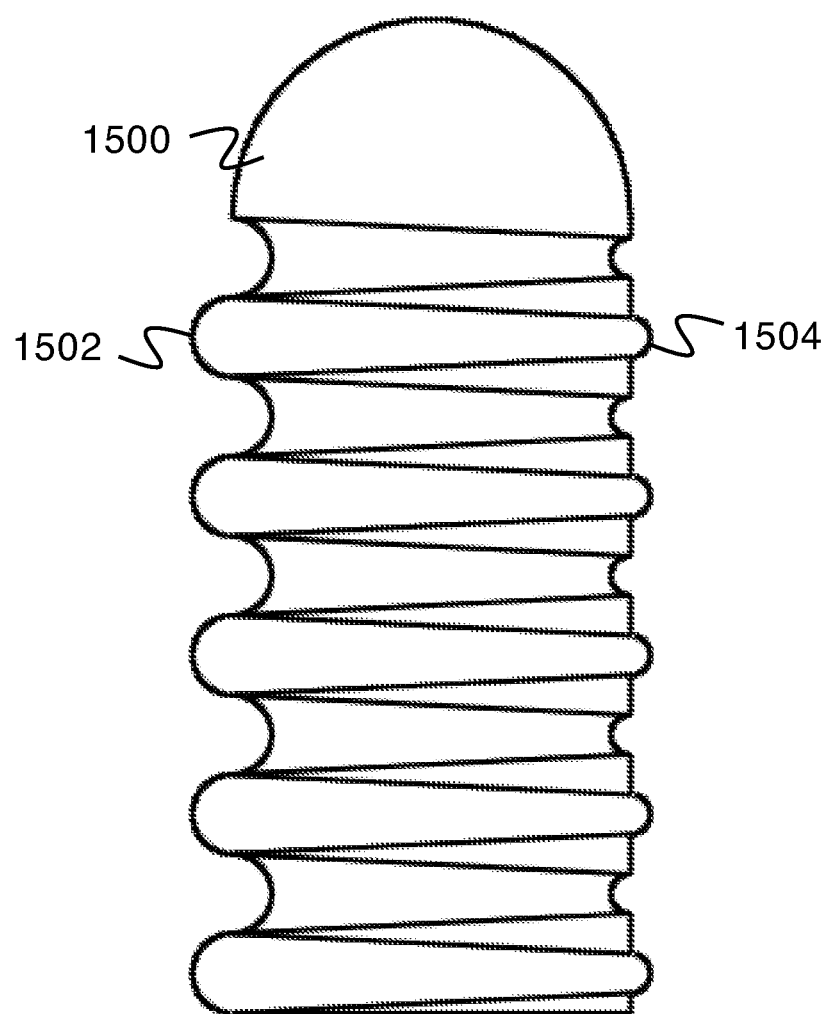
FIG. 15 is a diagram illustrating a side view of an embodiment of a chamber with asymmetric convolutions.

FIG. 15 is a diagram illustrating a side view of an embodiment of a chamber with asymmetric convolutions. In some embodiments, chamber 1504 comprises a one degree of freedom fluidic actuator (e.g., as in chamber 100 of FIG. 1). In the example shown, chamber 1500 comprises asymmetric convolutions. Each convolution has a large side (e.g., large side 1502) and a small side (e.g., small side 1504). Large convolutions provide greater compliance than small convolutions, causing the compliance on one side of the chamber to be greater than the compliance on the other side of the chamber. In some embodiments, the uneven compliance causes the chamber to bend as it expands and contracts. In some embodiments, the convolutions on a chamber can be designed to give the chamber a desired shape when expanded (e.g., S-curve, spiral, etc.).

Figure 16:
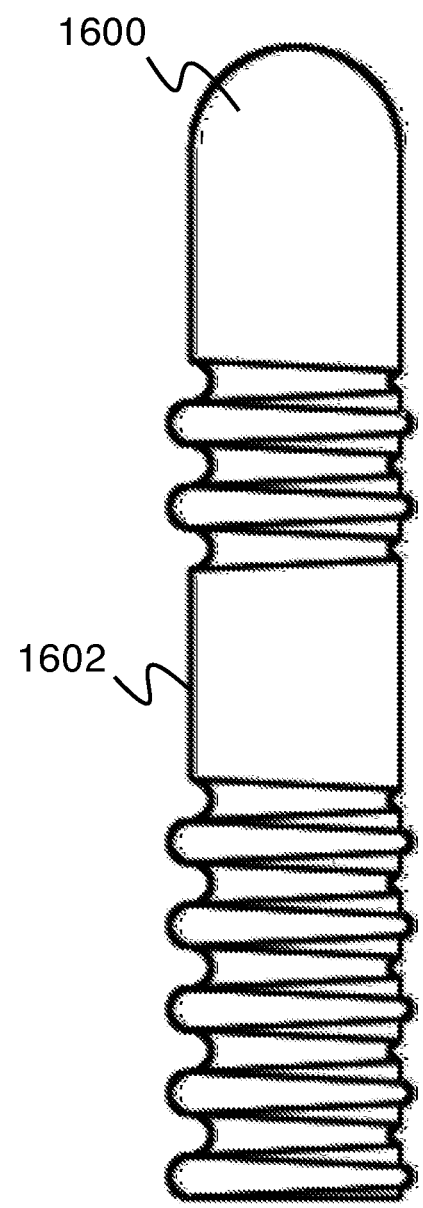
FIG. 16 is a diagram illustrating a side view of an embodiment of a chamber with discontinuous convolutions.

FIG. 16 is a diagram illustrating a side view of an embodiment of a chamber with discontinuous convolutions. In some embodiments, chamber 1600 comprises a one degree of freedom fluidic actuator (e.g., as in chamber 100 of FIG. 1). In the example shown, chamber 1600 comprises convolutions including a discontinuity. Discontinuity 1602 comprises a section that remains straight and not deformed as the volume of chamber 1600 changes. In some embodiments, chamber 1600 changes in the shape of a curling finger as the volume changes (e.g., bending regions including asymmetric convolutions simulate knuckles, and straight regions including discontinuities simulate bones).

Figure 17:
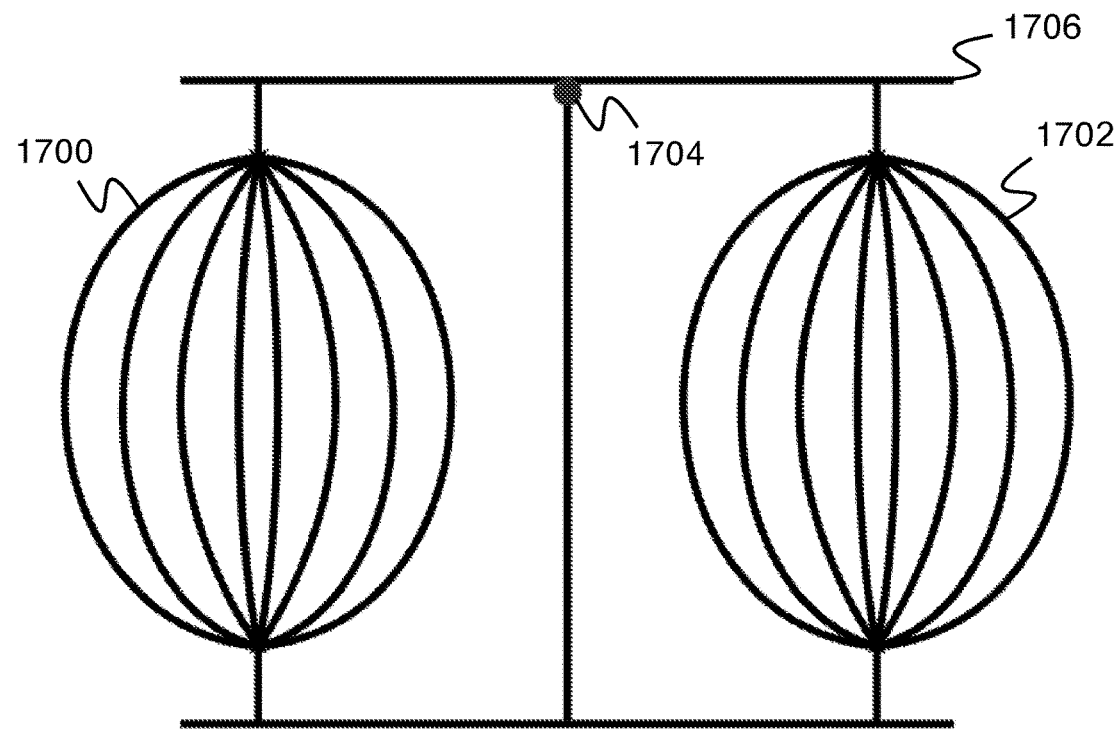
FIG. 17 is a diagram illustrating side views of an embodiment of two positions of a rolling fluidic actuator incorporating a vertical convolution chamber.
Figure 17:
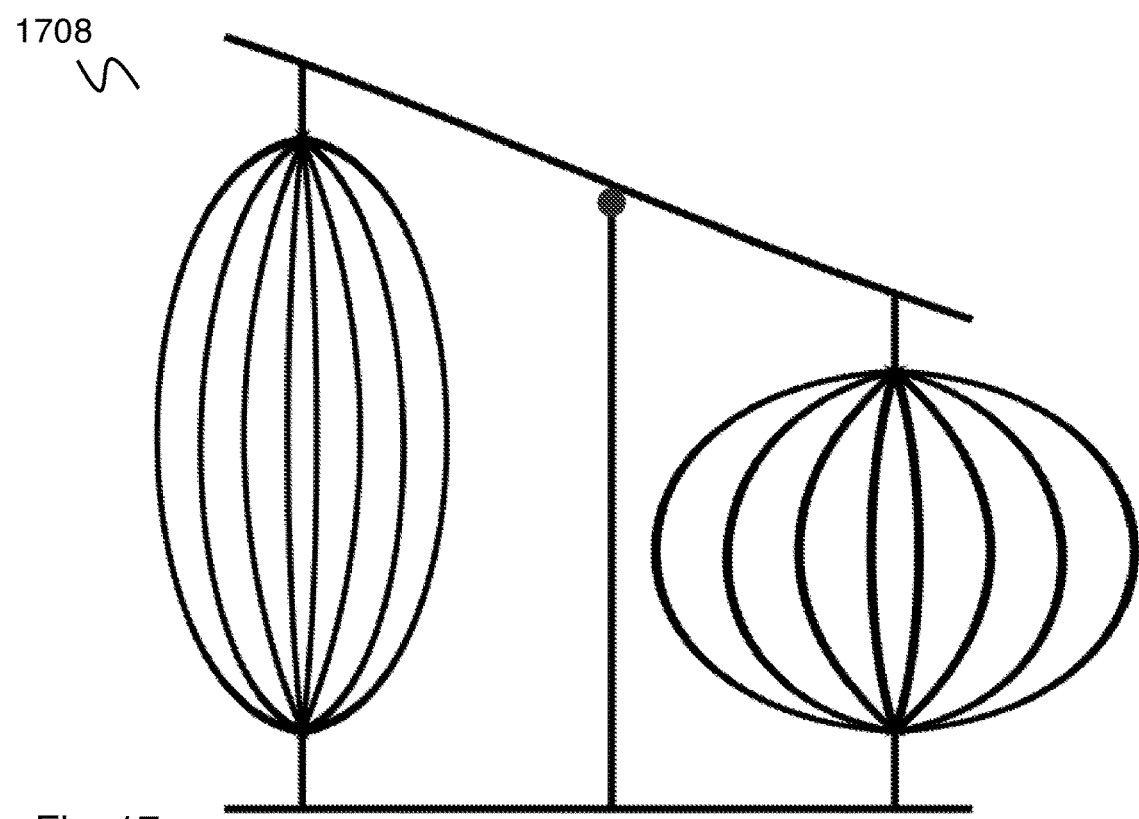

FIG. 17 is a diagram illustrating side views of an embodiment of two positions of a fluidic actuator incorporating a vertical convolution chamber. In the example shown, each of chamber 1700 and chamber 1702 comprises a vertical convolution chamber. In some embodiments, a vertical convolution chamber comprises a chamber including vertical convolutions (e.g. that cause the diameter of the chamber to expand and contract when the internal volume changes, rather than the length). Chamber 1700 and chamber 1702 are connected to effector 1706. Effector 1706 is mounted on pivot 1704. If the volume of chamber 1700 and the volume of chamber 1702 change in opposite directions, pivot 1704 rotates and effector 1706 tilts. If the pressure of chamber 1700 and the pressure of chamber 1702 change in opposite directions, the torque applied to effector 1706 changes. In some embodiments, if the pressure of chamber 1700 and the pressure of chamber 1702 change in the same direction while maintaining a constant pressure ration, pivot 1704 and effector 1706 do not move. In some embodiments, if the volume of chamber 1700 and the volume of chamber 1702 both increase, the actuator stiffness increases (e.g., the external force necessary to move effector 1706 increases). Actuator 1708 comprises a fluidic actuator actuated to tilt its effector to the right.

Figure 18:
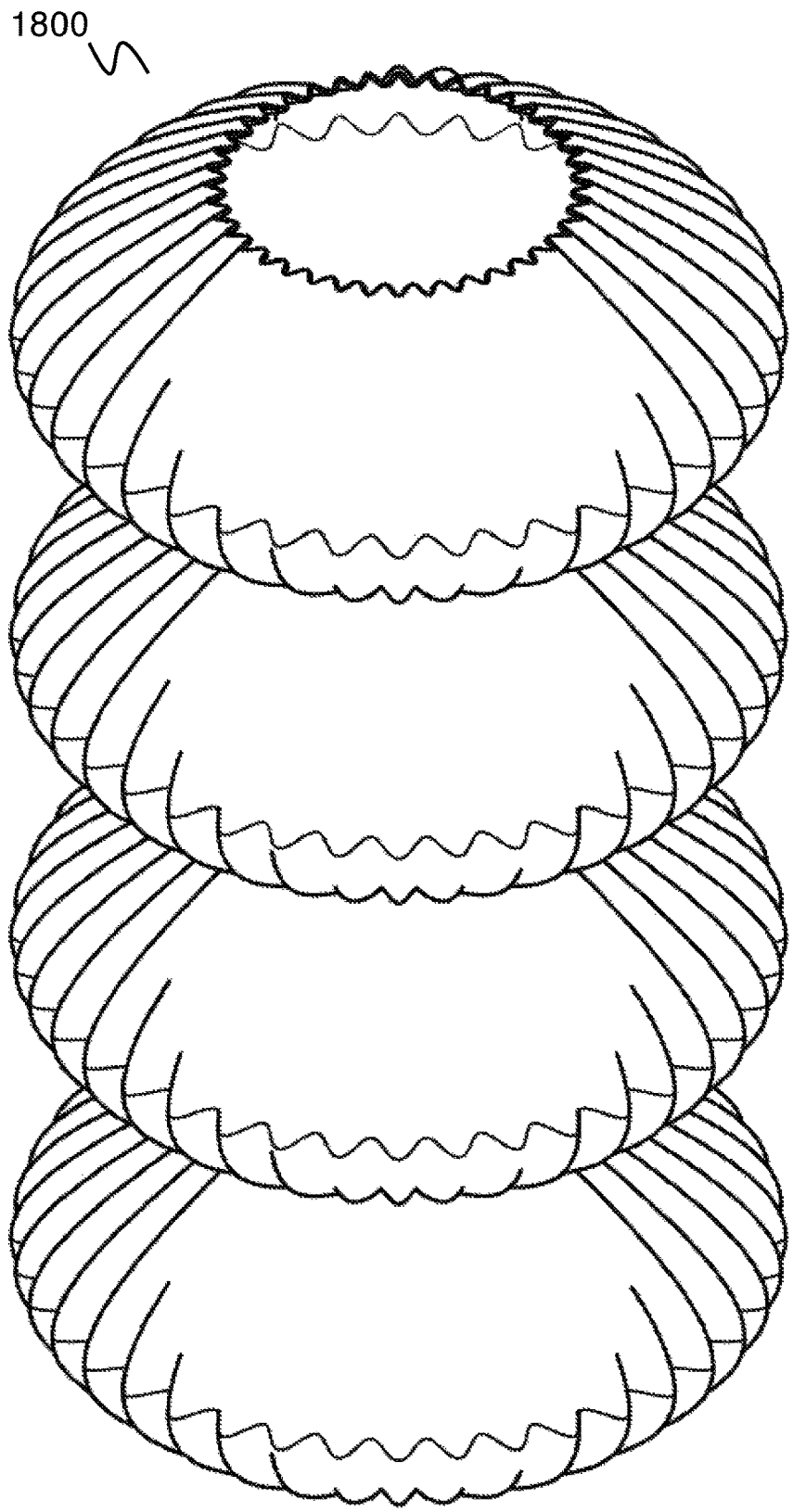
FIG. 18 is a diagram illustrating an embodiment of an extended vertical convolution chamber.

FIG. 18 is a diagram illustrating an embodiment of an extended vertical convolution chamber. In the example shown, chamber 1800 comprises a vertical convolution chamber (e.g., as in chamber 1700 of FIG. 17). Chamber 1800 comprises multiple stacked levels of vertical convolution chambers, in order to increase the total extension possible when the chamber volume is increased. In some embodiments, chamber 1800 comprises a multiple convolution chamber (e.g., including circumferential primary convolutions and vertical secondary convolutions).

A solar actuator system comprises a fluidic actuator. The fluidic actuator comprises at least two push-push (e.g., antagonistically actuated) linked chambers used to position control an end-effector in one or two axes. A fluidic actuator controlling an end-effector in one axis comprises two or more chambers. A fluidic actuator controlling an end-effector in two axes comprises three or more chambers. The end-effector comprises one or more tools for the collection or redirection of energy (e.g., photons or other light energy). In various embodiments, the end-effector comprises a reflector, redirector, an optical concentrator, a spectrum-splitting device, a photovoltaic, a heat collector, or any other appropriate end-effector. In some embodiments, the fluid in the chambers of the fluidic actuator comprises a liquid. When the fluid in the chambers of the fluidic actuator comprises a liquid, the actuator position is determined by differentials between the volumes in each chamber of the actuator or by the ratio of pressures in the chambers. In some embodiments, the fluid in the chambers of the fluidic actuator comprises a gas. When the fluid in the chambers of the fluidic actuator comprises a gas, the actuator position is determined by the differential in pressure between the chambers of the actuator. In some embodiments, when the fluid in the chambers of the fluidic actuator comprises a gas, the actuator position is determined by the ratio of pressure in the chambers of the actuator; the actuator stiffness is determined by the magnitude of the pressure in the chambers of the actuator; the maximum deflection under loading can be tuned by increasing or decreasing the maximum control pressures required by the system; the maximum deflection under loading can be actively changed in response to the environment; and external loads can be detected by monitoring pressure and the overall system pressures can be increased or decreased in response.

In some embodiments, the fluidic actuator comprises a bellows actuator. The bellows convolutions are designed to increase the effective area under which pressure acts when compressed. For a given bellows end force, the required bellows pressure varies with the extension of the actuator. In various embodiments, the convolutions have a uniformly inward curvature, the convolutions are semicircular, the convolutions are elliptical (e.g., to allow for a desired compliance and range of motion on the end-effector), the convolutions are sinusoidal, or the convolutions have any other appropriate profile. In some embodiments, the convolution profile is used to change the bellows force profile and range of motion. In some embodiments, a mechanical structure fixes a portion of the end-effector with respect to the bottom coupler of the actuator. In various embodiments, the mechanical structure comprises a cable, a universal joint, a flexure, a hinge, a pivot, a slider, a rack and pinion, a four-bar-linkage, a gear chain, a crank, a living hinge, or any other appropriate mechanical structure or flexure joint. In some embodiments, the fluidic actuator is formed from a blow-molded thermopolymer. In some embodiments, a multi-stage blow-molding process is used (e.g., for environmental protection such as UV protection).

In some embodiments, the fluidic actuator comprises a rhombus actuator. In some embodiments, a rhombus actuator comprises two four-bar-linkage based chambers. An outer side of each four-bar linkage is grounded, and the connecting inner side is linked via a kinematic linkage to the other chamber. To increase the range of motion, additional sets of chambers can be added and pressure-ganged to the adjacent chamber. The linkage can also be used to gear the actuator to change the range of motion. The differential in control pressures determines the angle. The pressure ratio in the chambers causes the chambers to increase or decrease in volume. The coupling of the two vessels results in a displacement of the end-effector. In some embodiments, the actuator comprises an inherently fluid-tight closed volume. In some embodiments, the actuator comprises a separate open-volume actuator with an internal bladder. In various embodiments, the linkage is injection-molded, extruded, or formed by any other appropriate forming process. In some embodiments, the linkage is airtight. In some embodiments, the linkage incorporates an airtight bladder. In various embodiments, a bladder for the linkage is blow-molded, extruded, co-extruded with an axial reinforcement, co-extruded with a radial reinforcement, or formed by any other appropriate forming process.

In some embodiments, the fluidic actuator comprises a bulbous actuator. In some embodiments, a bulbous actuator comprises a deformable geometry with a closed bladder (e.g., a bulb) for rotating an end-effector in one dimension. In some embodiments, the bulb is completely compliant to bending. The bulb rolls flat against a positioning surface (e.g., when not inflated) and expands out into a circular arc. The circular portion is tangent to the spine (e.g., the axis of rotation of the end-effector) and the positioning coupler. The circular portion does not apply a moment about the pivot point unless the center of rotation is not coincident with the positioning surface, in which case the tangential force from the arc applies a moment on the mechanism. The contact area under the positioning coupler is an inverse function of the area swept out by the actuator. In some embodiments, multiple bulbs are used on either side of the positioning coupler to increase range of motion, accuracy, and/or accuracy/mass ratio. In various embodiments, the bulb is blow molded, extruded, co-extruded with axial reinforcement, co-extruded with radial reinforcement, or formed in any other appropriate way. In some embodiments, secondary convolutions are added to increase compliance. In some embodiments, the secondary convolutions are added around the ends of bulb. In some embodiments, the bulb is constructed from a coated largely impermeable textile formed into a tube with closed and sealed ends.

Figure 19:
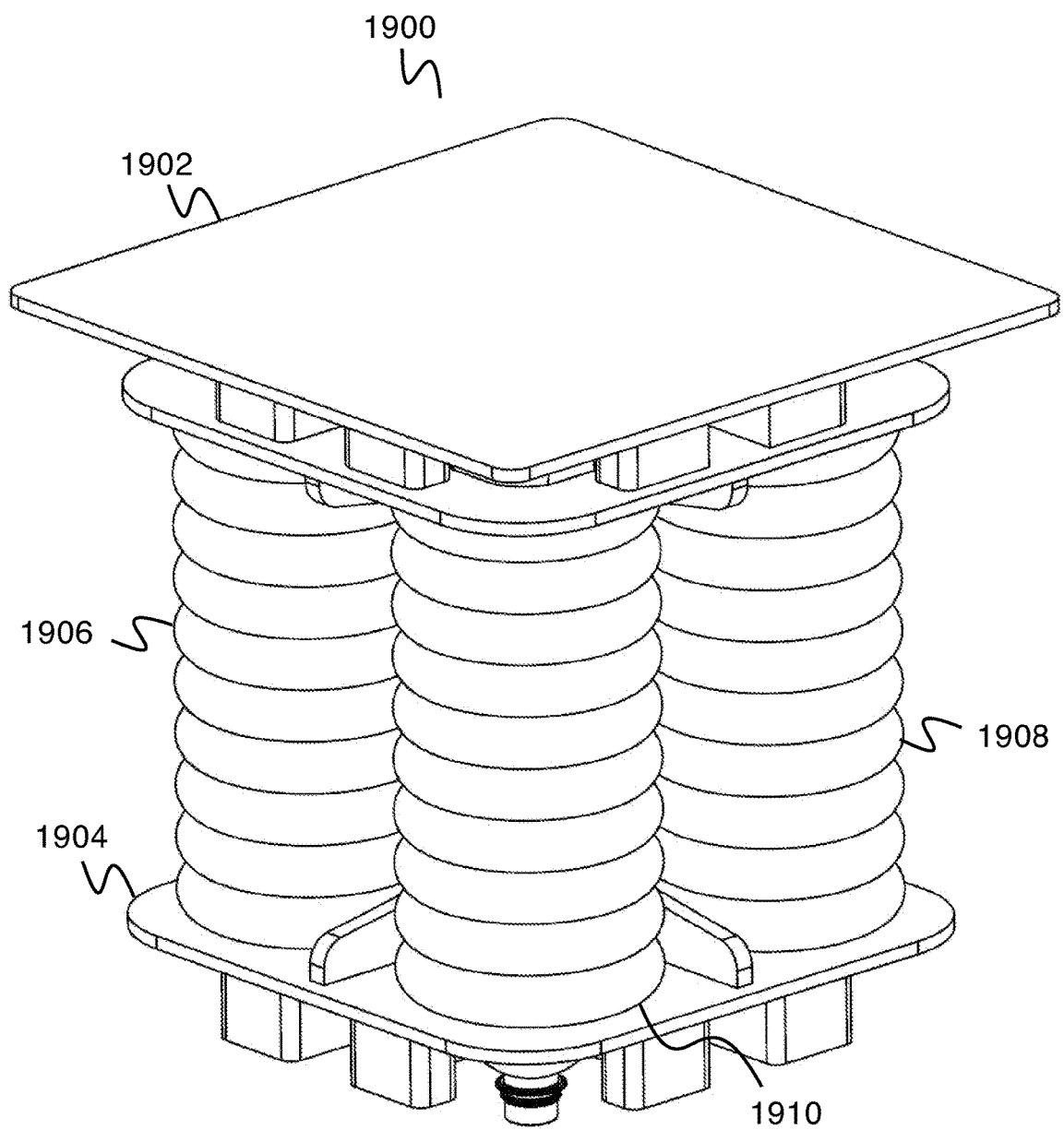
FIG. 19 is a diagram illustrating an embodiment of a solar actuator.

FIG. 19 is a diagram illustrating an embodiment of a solar actuator. In the example shown, solar actuator 1900 comprises top coupler 1902, bottom coupler 1904, bellows actuator 1906, bellows actuator 1908, and bellows actuator 1910. In some embodiments, solar actuator 1900 additionally comprises a fourth bellows actuator, hidden behind bellows actuator 1906, bellows actuator 1908, and bellows actuator 1910. In various embodiments, solar actuator 1900 comprises one, two, three, four, or any other appropriate number of bellows actuators. In various embodiments, one or more of bellows actuator 1906, bellows actuator 1908, and bellows actuator 1910 comprise blow molded actuators. In some embodiments, bellows actuator 1906, bellows actuator 1908, and bellows actuator 1910 move top coupler 1902 relative to bottom coupler 1904. In some embodiments, the position of top coupler 1902 relative to bottom coupler 1904 is determined by the pressure in bellows actuator 1906, bellows actuator 1908, and bellows actuator 1910. In some embodiments, the position of top coupler 1902 relative to bottom coupler 1904 is determined by the volume of bellows actuator 1906, bellows actuator 1908, and bellows actuator 1910. In some embodiments, the amount of deflection under loading of top coupler 1902 relative to bottom coupler 1904 is determined at least in part by the average pressure in bellows actuator 1906, bellows actuator 1908, and bellows actuator 1910. In some embodiments, each of bellows actuator 1906, bellows actuator 1908, and bellows actuator 1910 comprises a chamber as in chamber 100 of FIG. 1. In some embodiments, each of bellows actuator 1906, bellows actuator 1908, and bellows actuator 1910 comprises a stem bellows actuator. In some embodiments, the faces of top coupler 1902 and bottom coupler 1904 contacted by each of bellows actuator 1906, bellows actuator 1908, and bellows actuator 1910 are parallel. In some embodiments, solar actuator 1900 comprises a stem actuator.

In some embodiments, solar actuator 1900 additionally comprises a fixing structure for fixing a top coupler point to a bottom coupler point. In various embodiments, the fixing structure comprises a cable, a universal joint, a flexure, or any other appropriate fixing structure. In some embodiments, solar actuator 1900 additionally comprises an end effector coupled to top coupler 1902. In various embodiments, the end effector comprises a redirector, a reflector, a collector, an optical concentrator, a spectrum splitting device, a photovoltaic material, a heat collector, or any other appropriate end effector.

Figure 20:
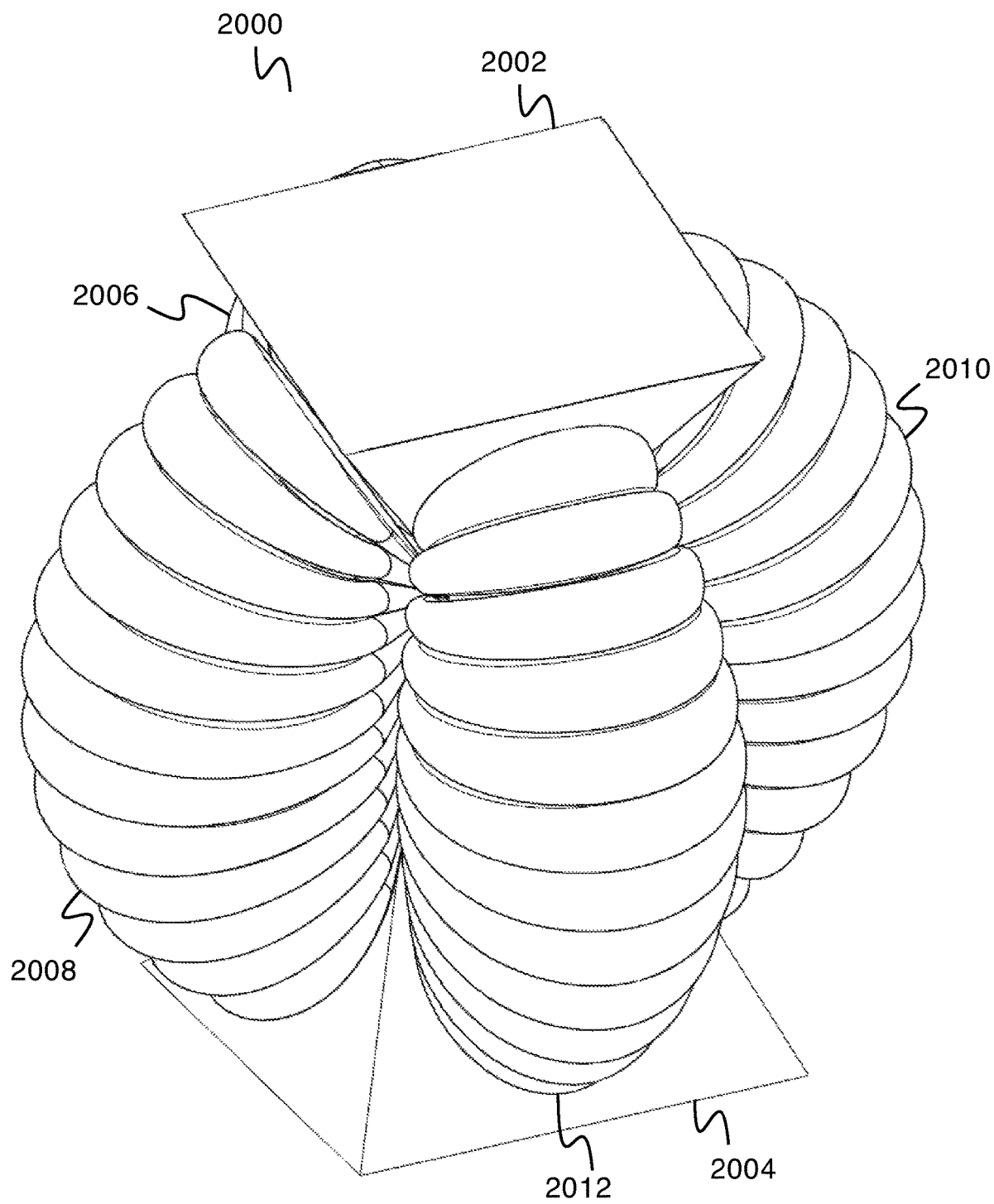
FIG. 20 is a diagram illustrating an embodiment of a solar actuator.

FIG. 20 is a diagram illustrating an embodiment of a solar actuator. In the example shown, solar actuator 2000 comprises top coupler 2002, bottom coupler 2004, bellows actuator 2006, bellows actuator 2008, bellows actuator 2010, and bellows actuator 2012. In various embodiments, one or more of bellows actuator 2006, bellows actuator 2008, bellows actuator 2010, and bellows actuator 2012 comprise mass manufactured actuators. In some embodiments, bellows actuator 2006, bellows actuator 2008, bellows actuator 2010, and bellows actuator 2012 move top coupler 2002 relative to bottom coupler 2004. In some embodiments, solar actuator 2000 additionally comprises a fixing structure for fixing a top coupler point to a bottom coupler point. In various embodiments, the fixing structure comprises a cable, a universal joint, a flexure, or any other appropriate fixing structure. In some embodiments, solar actuator 2000 additionally comprises an end effector coupled to top coupler 2002. In various embodiments, the end effector comprises a redirector, a reflector, a collector, an optical concentrator, a spectrum splitting device, a photovoltaic material, a heat collector, or any other appropriate end effector. In some embodiments, the faces of top coupler 2002 and bottom coupler 2004 contacted by each of bellows actuator 2006, bellows actuator 2008, bellows actuator 2010, and bellows actuator 2012 are not parallel. In some embodiments, the faces of top coupler 2002 and bottom coupler 2004 contacted by each of bellows actuator 2006, bellows actuator 2008, bellows actuator 2010, and bellows actuator 2012 are perpendicular. In some embodiments, solar actuator 2000 comprises a grub actuator.

Figure 21:
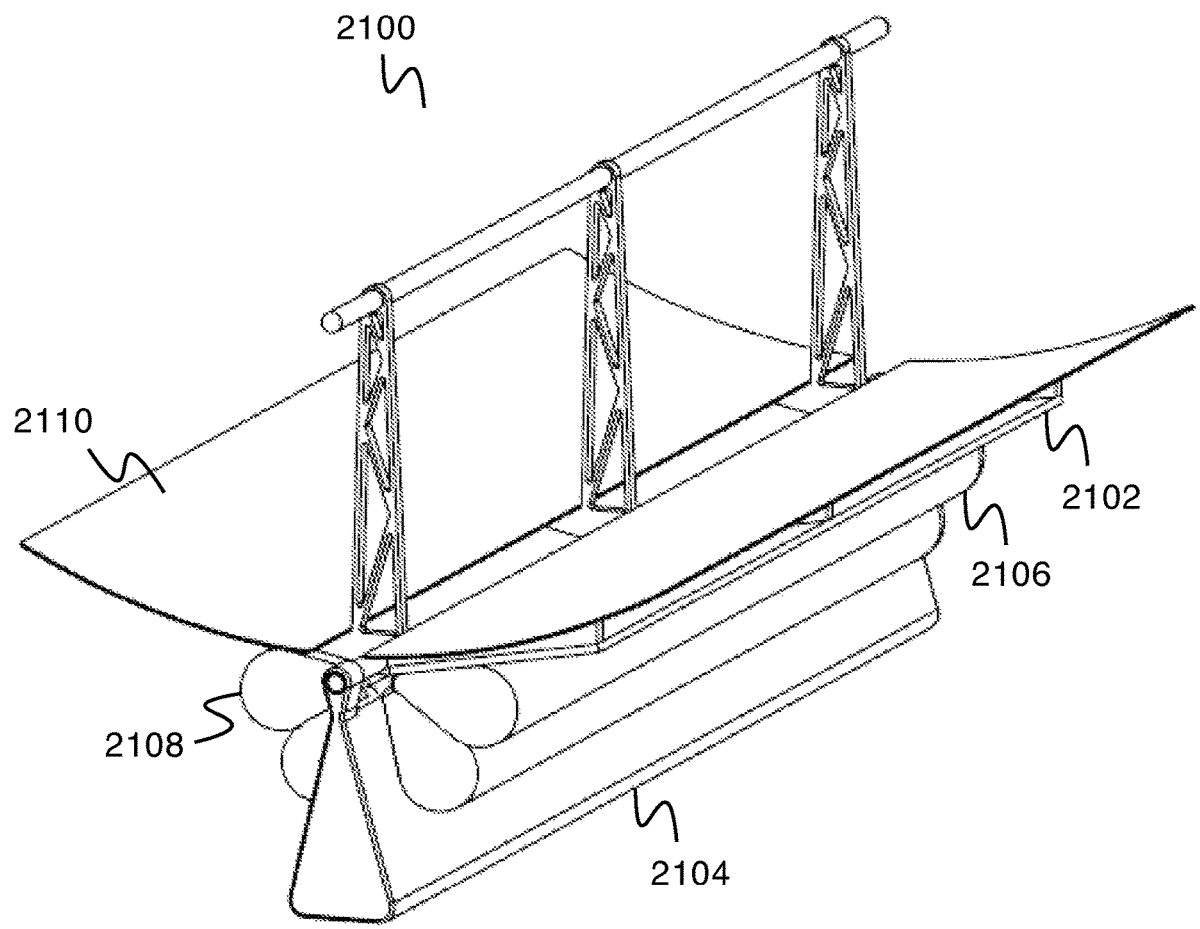
FIG. 21 is a diagram illustrating an embodiment of a solar actuator.

FIG. 21 is a diagram illustrating an embodiment of a solar actuator. In the example shown, solar actuator 2100 comprises top coupler 2102, bottom coupler 2104, bellows actuator 2106 and bellows actuator 2108. In various embodiments, one or more of bellows actuator 2106 and bellows actuator 2108 comprise mass manufactured actuators. In some embodiments, bellows actuator 2106 and bellow's actuator 2108 move top coupler 2102 relative to bottom coupler 2104. In some embodiments, the angular position of top coupler 2102 relative to bottom coupler 2104 depends on the relative pressure of bellows actuator 2106 and bellows actuator 2108. In some embodiments, solar actuator 2100 additionally comprises a fixing structure for fixing a top coupler point or points to a bottom coupler point or points. In various embodiments, the fixing structure comprises a cable, a universal joint, a flexure, or any other appropriate fixing structure. Solar actuator 2100 additionally comprises end effector 2110 coupled to top coupler 2102. In the example shown, end effector 2110 comprises a solar concentrator. In the example shown, solar actuator 2100 comprises a rolling actuator. In some embodiments, solar actuator 2110 comprises a bulbous actuator.

Figure 22:
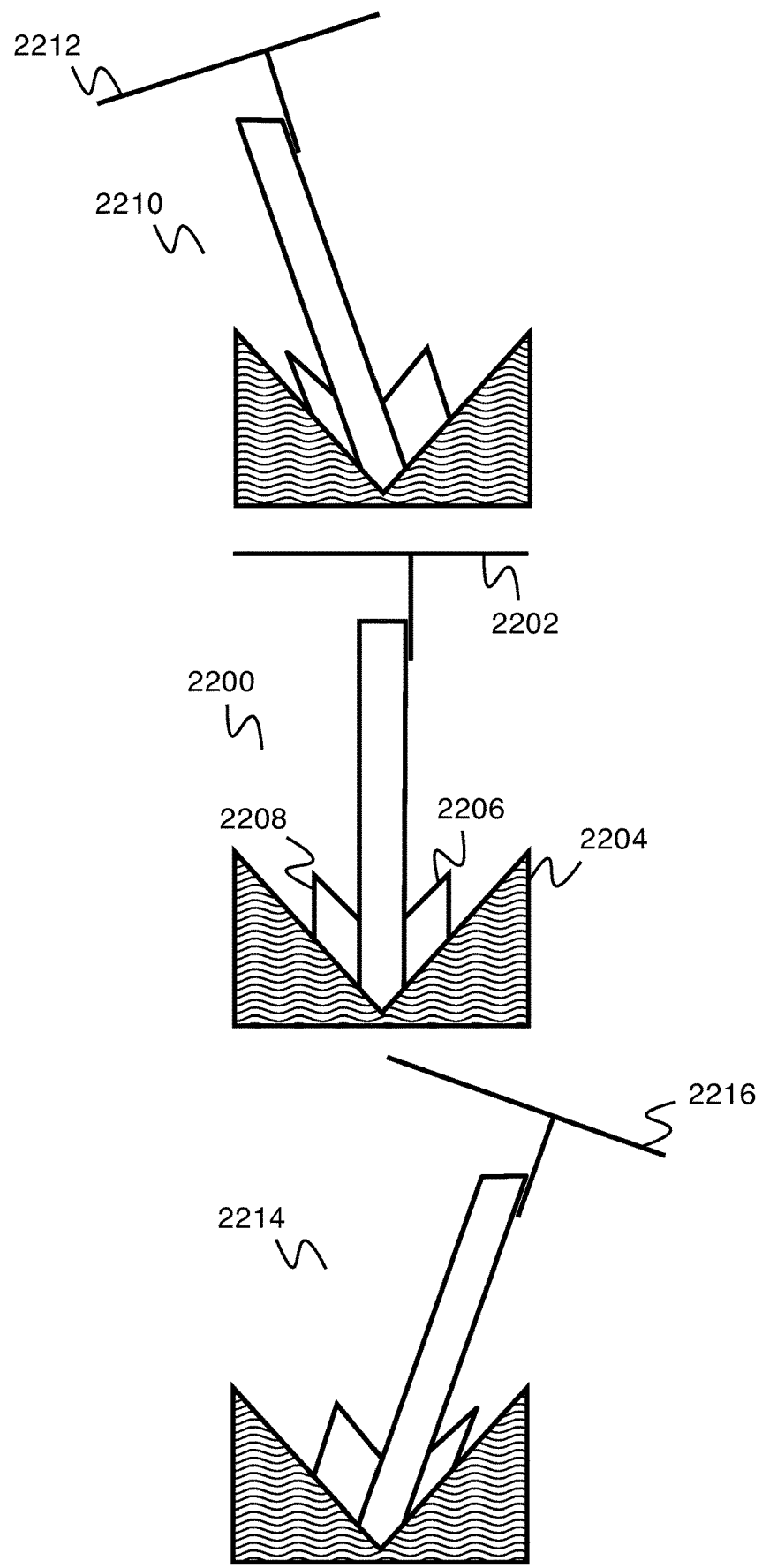
FIG. 22 is a diagram illustrating an embodiment of a solar actuator.

FIG. 22 is a diagram illustrating an embodiment of a solar actuator. In the example shown, solar actuator 2200 comprises top coupler 2202, bottom coupler 2204, bellows actuator 2206 and bellows actuator 2208. In various embodiments, one or more of bellows actuator 2206 and bellows actuator 2208 comprise mass manufactured actuators. In some embodiments, bellows actuator 2206 and bellows actuator 2208 comprises rhombus bellows. In some embodiments, bellows actuator 2206 and bellow's actuator 2208 move top coupler 2102 relative to bottom coupler 2204. In some embodiments, the angular position of top coupler 2202 relative to bottom coupler 2204 depends on the relative pressure of bellows actuator 2206 and bellows actuator 2208. In some embodiments, solar actuator 2200 additionally comprises a fixing structure for fixing a top coupler point to a bottom coupler point. In various embodiments, the fixing structure comprises a cable, a universal joint, a flexure, or any other appropriate fixing structure. Solar actuator 2200 comprises a rolling actuator. In some embodiments, solar actuator 2210 comprises a rhombus actuator. Solar actuator 2210 comprises solar actuator 2200 with top coupler 2212 tilted left. Solar actuator 2214 comprises solar actuator 2200 with top coupler 2216 tilted right.

Figure 23:
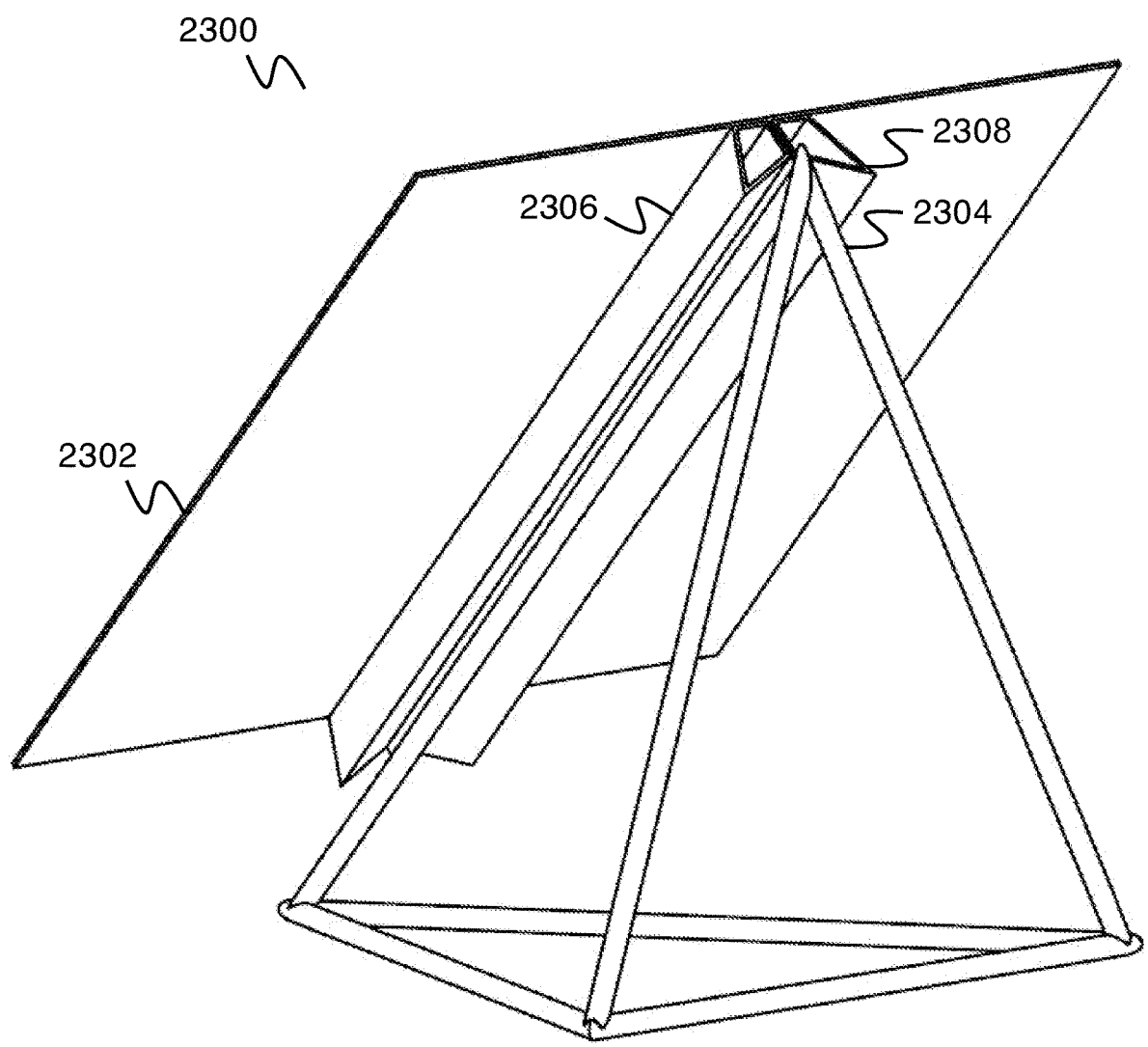
FIG. 23 is a diagram illustrating an embodiment of a solar actuator.

FIG. 23 is a diagram illustrating an embodiment of a solar actuator. In the example shown, solar actuator 2300 comprises top coupler 2302, bottom coupler 2304, bellows actuator 2306 and bellows actuator 2308. In various embodiments, one or more of bellows actuator 2306 and bellows actuator 2308 comprise mass manufactured actuators. In some embodiments, bellows actuator 2306 and bellows actuator 2308 comprises a rhombus bellows. In some embodiments, bellows actuator 2306 and bellows actuator 2308 move top coupler 2302 relative to bottom coupler 2304. In some embodiments, the angular position of top coupler 2302 relative to bottom coupler 2304 depends on the relative pressure of bellows actuator 2306 and bellows actuator 2308. In some embodiments, solar actuator 2300 additionally comprises a fixing structure for fixing a top coupler point to a bottom coupler point. In various embodiments, the fixing structure comprises a cable, a universal joint, a flexure, or any other appropriate fixing structure. In the example shown, solar actuator 2300 comprises a rolling actuator. In some embodiments, solar actuator 2310 comprises a rhombus actuator.

Figure 24:
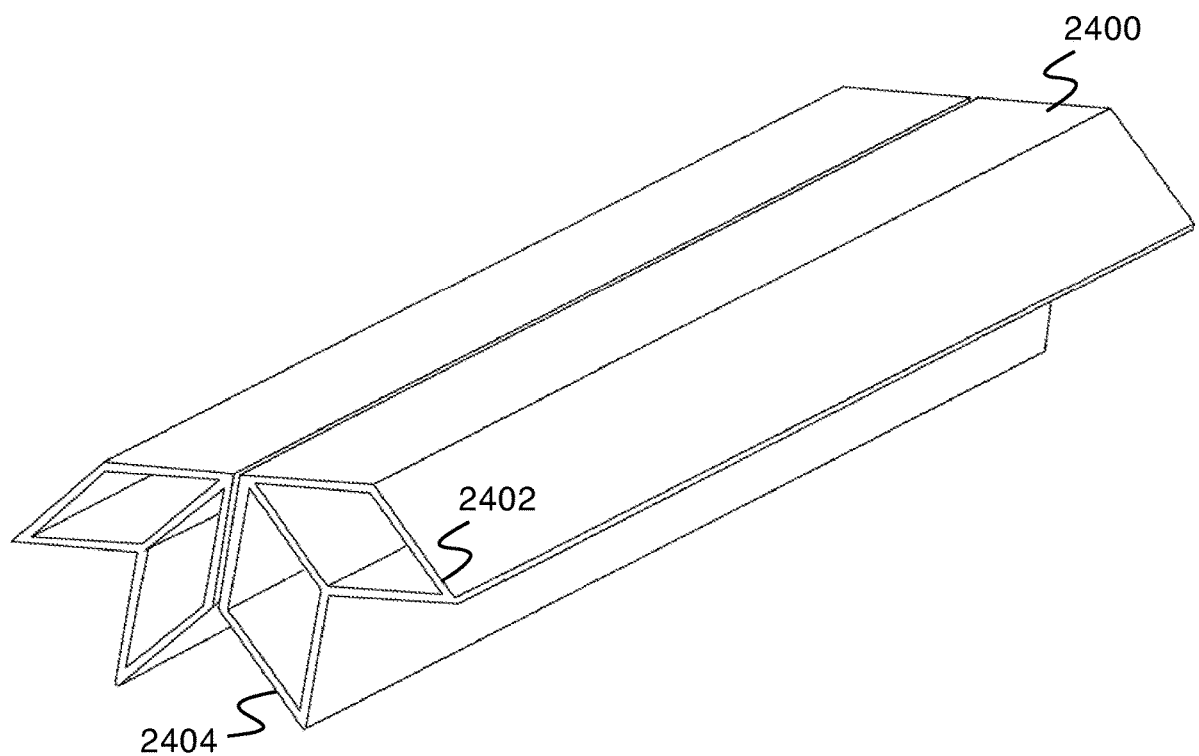
FIG. 24 is a diagram illustrating an embodiment of double rhombus bellows.

FIG. 24 is a diagram illustrating an embodiment of double rhombus bellows. In some embodiments, double rhombus bellows are used in a rhombus actuator (e.g., solar actuator 2200 of FIG. 22 or solar actuator 2300 of FIG. 23). In the example shown, double rhombus bellows 2400 comprises rhombus bellows 2402 and rhombus bellows 2404. In some embodiments, a rhombus bellows expands an angular distance for a given change in internal pressure. In some embodiments, a double rhombus bellows expands twice the distance of a rhombus bellows for the same change in internal pressure.

Figure 25:
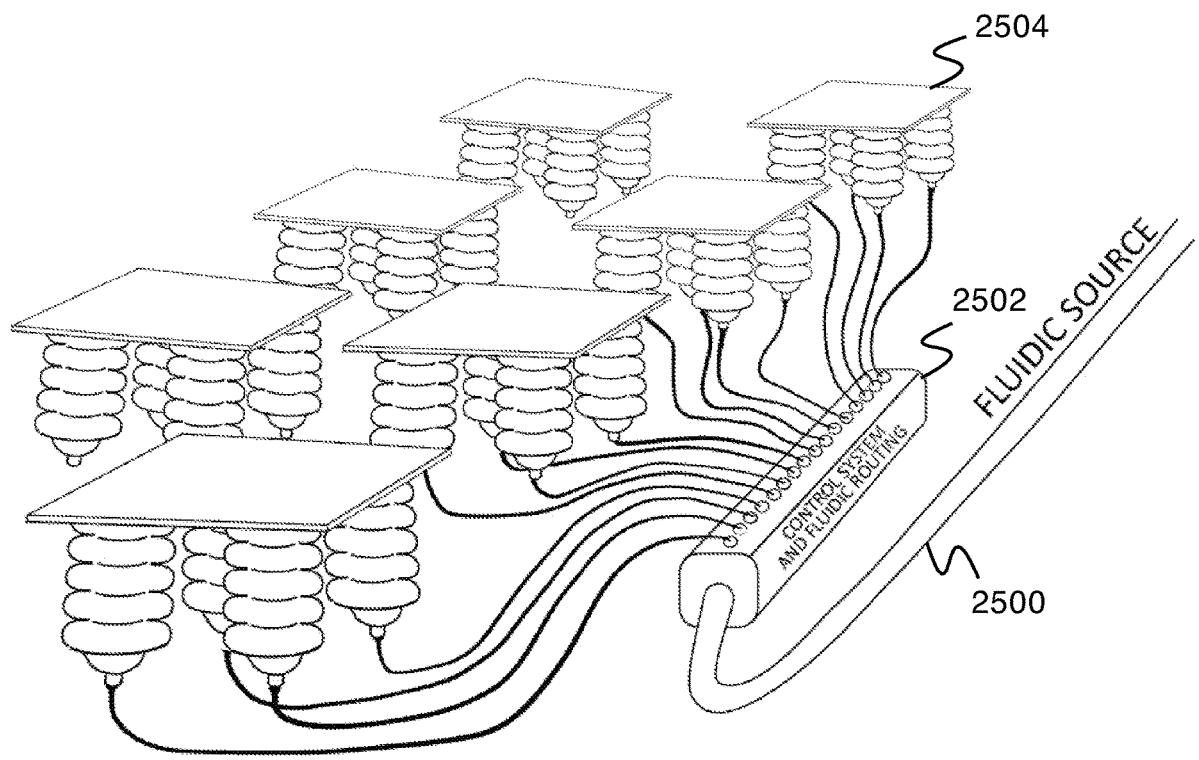
FIG. 25 is a diagram illustrating an embodiment of a control system for a set of solar actuators.

FIG. 25 is a diagram illustrating an embodiment of a control system for a set of solar actuators. In some embodiments, the control system of FIG. 25 comprises a control system for controlling solar actuators (e.g., solar actuator 1900 of FIG. 19). In the example shown, fluidic source 2500 is modulated by control system and fluidic routing 2502 to control a set of solar actuators (e.g., solar actuator 2504). In various embodiments, the set of solar actuators comprises 4 solar actuators 7 solar actuators, 15 solar actuators, 122 solar actuators, 1566 solar actuators, or any other appropriate number of solar actuators. The control system of the solar actuators controls the solar actuators to positions appropriate for the solar system. For example, redirectors or reflectors are positioned to concentrate solar light at a receiver (e.g., a power generating system, a desalinization system, etc.). For example, solar panels on the actuators are positioned perpendicular to the solar light.

Figure 26:
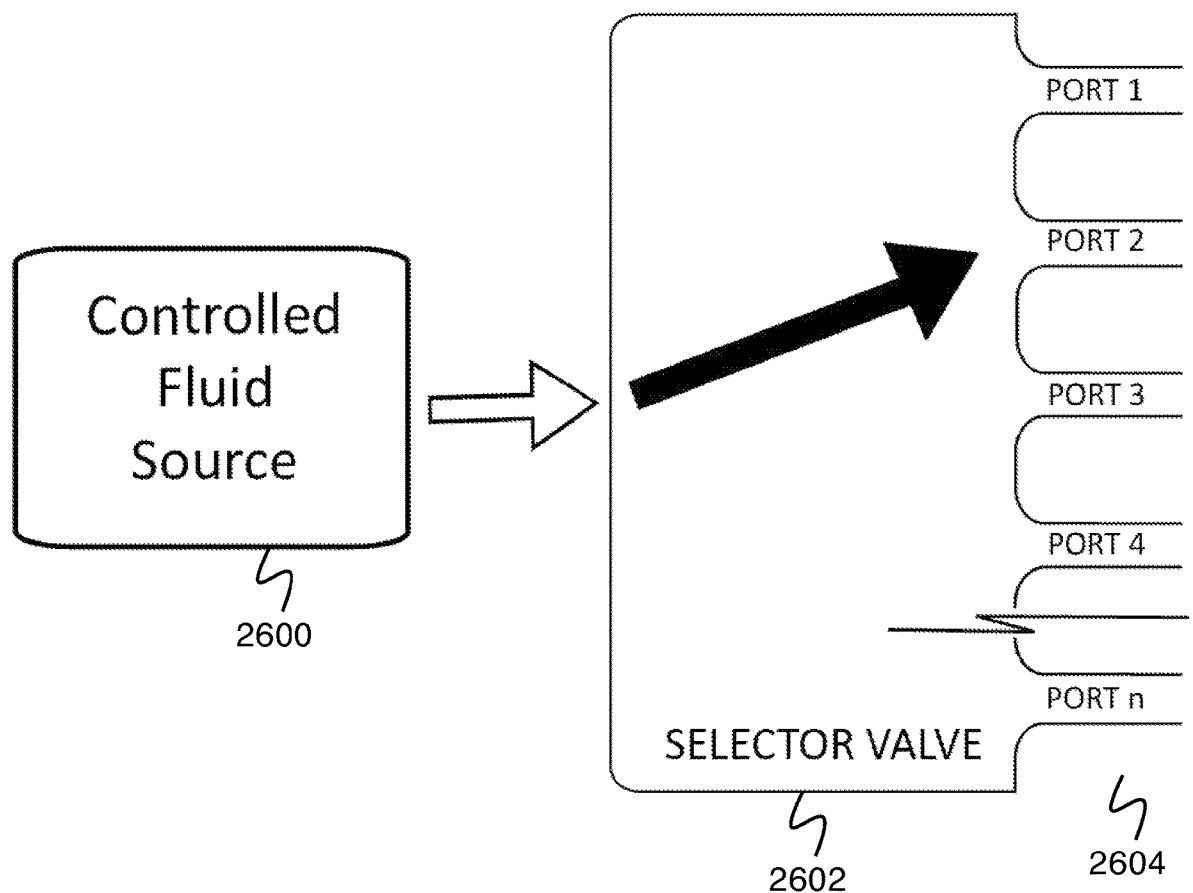
FIG. 26 is a diagram illustrating an embodiment of a control system and fluidic routing.

FIG. 26 is a diagram illustrating an embodiment of a control system and fluidic routing. In some embodiments, the control system and fluidic routing of FIG. 26 comprises control system and fluidic routing 2502 of FIG. 25. In the example shown, controlled fluid source 2600 passes through selector valve 2602 and into one of ports 2604. In various embodiments, ports 2604 comprises 4 ports, 13 ports, 22 ports, 5433 ports, or any other appropriate number of ports. In some embodiments, selector valve 2602 is capable of directing controlled fluid source 2600 to only one of ports 2604. In some embodiments, selector valve 2602 is capable of directing controlled fluid source 2600 to more than one of ports 2604. In some embodiments, a pump drives a single actuator and no valves are required. In some embodiments, N pumps drives M actuators and valves are or are not used as appropriate for the system to direct fluid and control actuation.

Figure 27:
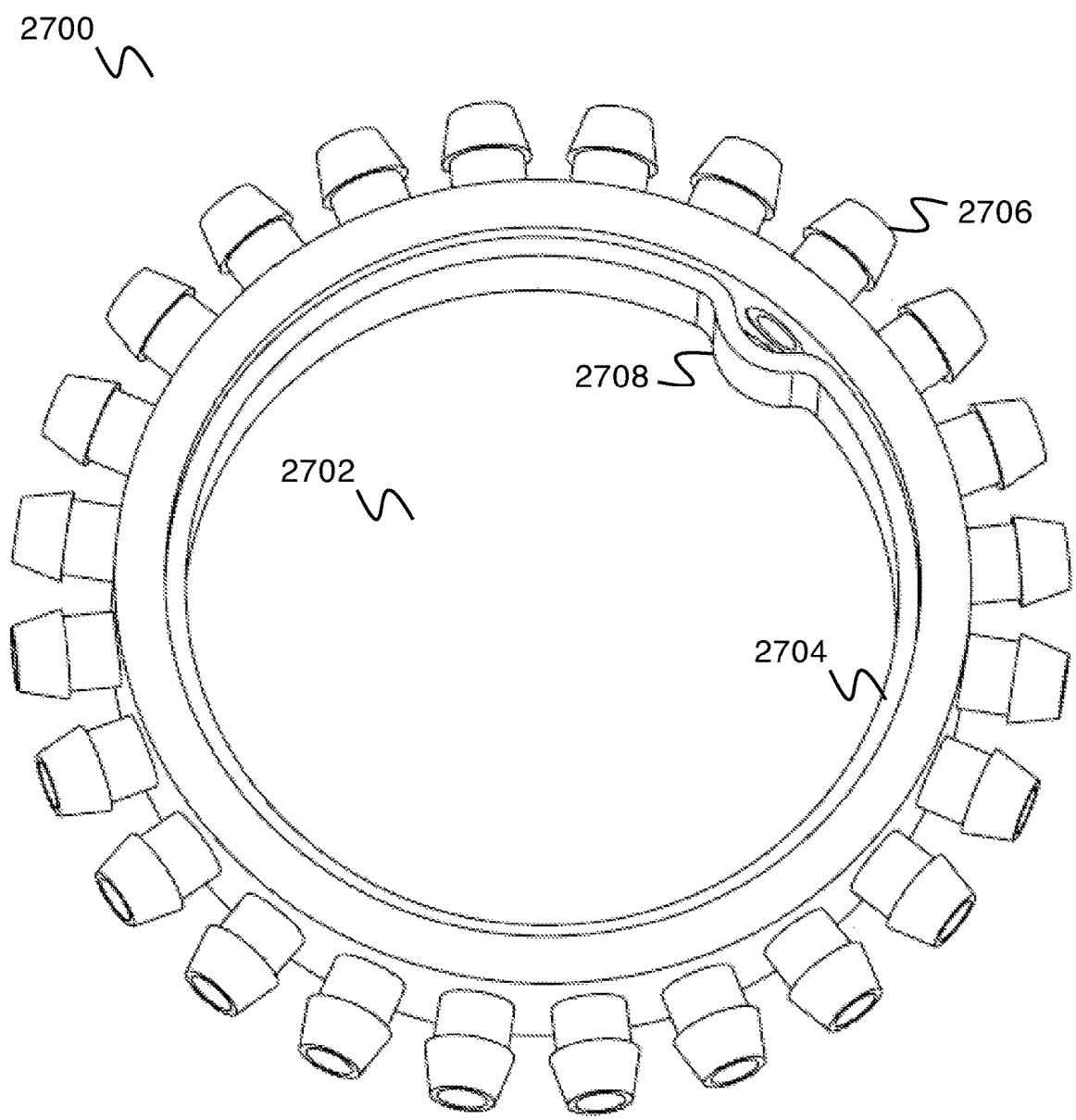
FIG. 27 is a diagram illustrating an embodiment of a selector valve.

FIG. 27 is a diagram illustrating an embodiment of a selector valve. In some embodiments, selector valve 2700 comprises selector valve 2602 of FIG. 26. In the example shown, selector valve 2700 comprises central pressure inlet tube 2702, selector ring 2704, and one or more ports (e.g., port 2706). In the example shown, central pressure inlet tube 2702 is connected to a controlled fluid source. Selector ring 2704 is turned until depression 2708 faces the desired port (e.g., in this case port 2706). Pressure can then move from central pressure inlet tube 2702 through the desired port. In some embodiments, multiple selector valves similar to selector valve 2700 are used to provide multiple actuators with fluids. In some embodiments, one selector valve is used to provide multiple actuators with fluids by ganging the output tubes.

Figure 28:
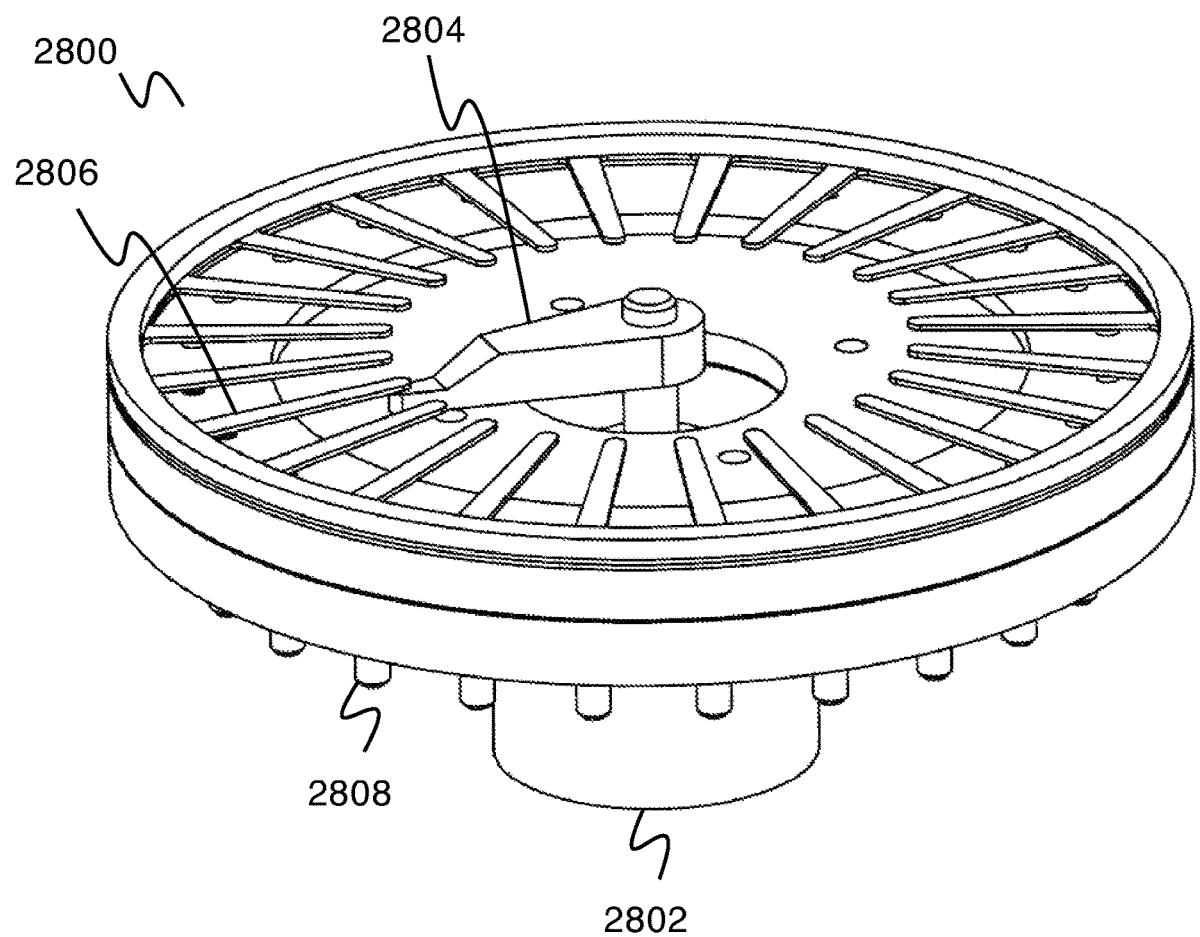
FIG. 28 is a diagram illustrating an embodiment of a selector valve.

FIG. 28 is a diagram illustrating an embodiment of a selector valve. In some embodiments, selector valve 2800 comprises selector valve 2602 of FIG. 26. In the example shown, selector valve 2800 comprises central pressure inlet tube 2802, selector 2804, one or more selector tabs (e.g., selector tab 2806), and one or more ports (e.g., port 2808). In some embodiments, each selector tab has an associated port. Central pressure inlet tube 2802 is connected to a controlled fluid source. Selector 2804 is turned until its tip contacts the desired selector tab (e.g., in this case selector tab 2806). When the selector tip contacts a selector tab, pressure from central pressure inlet tube 2802 can move through the selected port (e.g., the port associate with the selected selector tab).

Figure 29:
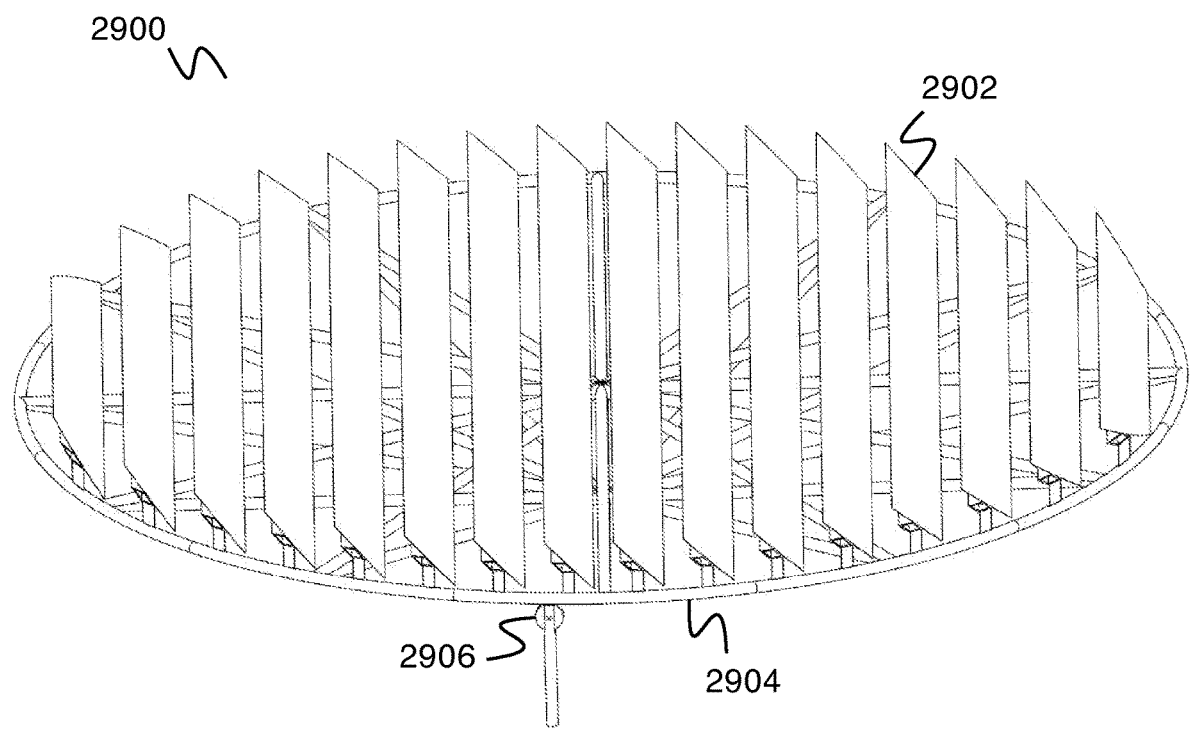
FIG. 29 is a diagram illustrating an embodiment of a photovoltaic array.

FIG. 29 is a diagram illustrating an embodiment of a photovoltaic array. In some embodiments, photovoltaic array 2900 comprises a one dimensional photovoltaic array. In some embodiments, photovoltaic array 2900 is controlled using the control system and fluidic routing of FIG. 26. In the example shown, mirror array 2900 comprises a set of rolling bellows actuators (e.g., rolling bellows actuator 2902) including end effectors comprising photovoltaic material. In some embodiments, each rolling bellows actuator comprises a rhombus actuator. In some embodiments, the control system and fluidic routing is able to independently control the angle of the end effector of each of the rolling bellows actuators. In some embodiments, the angle of the end effector of each of the rolling bellows actuators is controlled in order to match the angle of the sun. In some embodiments, photovoltaic array mount 2904 is able to rotate on wheel 2906. In some embodiments, photovoltaic array mount 2904 is able to rotate on wheel 2906 in order to match the direction of the sun.

Figure 30:
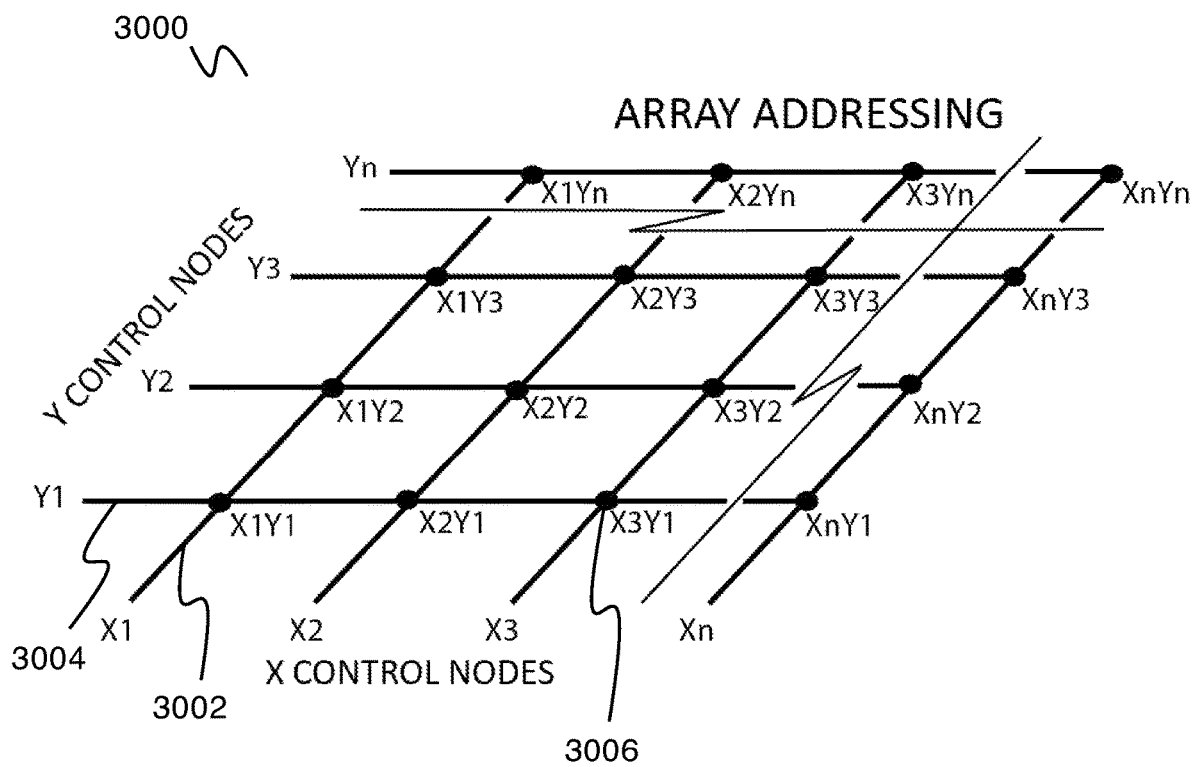
FIG. 30 is a diagram illustrating an embodiment of a two dimensional control array.

FIG. 30 is a diagram illustrating an embodiment of a two dimensional control array. In some embodiments, control array 3000 comprises a control array for controlling a two dimensional array of bellows actuators. In the example shown, control array 3000 comprises a set of vertical lines (e.g., vertical line 3002). In various embodiments, control array 3000 comprises 4, 10, 29, 358, or any other appropriate number of vertical lines. In some embodiments, each vertical line comprises a pressure supply line. In some embodiments, each vertical line comprises a pressure supply line at a high pressure. In some embodiments, each vertical line comprises a pressure supply line at a desired actuator pressure. In the example shown, control array 3000 comprises a set of horizontal lines (e.g., horizontal line 3004). In various embodiments, control array 3000 comprises 6, 9, 35, 122, or any other appropriate number of horizontal lines. In some embodiments, each horizontal line comprises a control line. In some embodiments, each horizontal line comprises an on/off control line (e.g., the voltage of the control line indicates to a valve whether to open or close). In the example shown, control array 3000 comprises a set of actuator nodes (e.g., actuator node 3006). In some embodiments, the number of actuator nodes comprises the product of the number of horizontal lines and the number of vertical lines. In some embodiments, each actuator node comprises a valve. In some embodiments, each actuator node additionally comprises a solar actuator connected to the valve. In some embodiments, the valve at an actuator node is connected to both the pressure supply line at the actuator node (e.g., for supplying pressure) and the control line at the actuator node (e.g., for indicating a control signal). In some embodiments, the valve is configured such that when the control line at the actuator node indicates an on signal, the pressure supply line is connected to the solar actuator. In some embodiments, the valve is configured such that when the control line at the actuator node indicates an off signal, the pressure supply line is not connected to the solar actuator. In some embodiments, when a control line indicates an on signal, each solar actuator (e.g., at each actuator node) in the control line row is connected to its corresponding pressure supply line. In some embodiments, the control signals (e.g., the signals sent on the control lines) are designed such that only one control line indicates an on signal at a time.

In some embodiments, the valves associated with a collection of solar actuators are controlled using a valve control system comprising: a single valve per chamber, a selector switch valve to connect one or more common fluidic sources to one, several, or all chambers, or a matrix multiplexed or an array addressed set of chambers.

Figure 31:
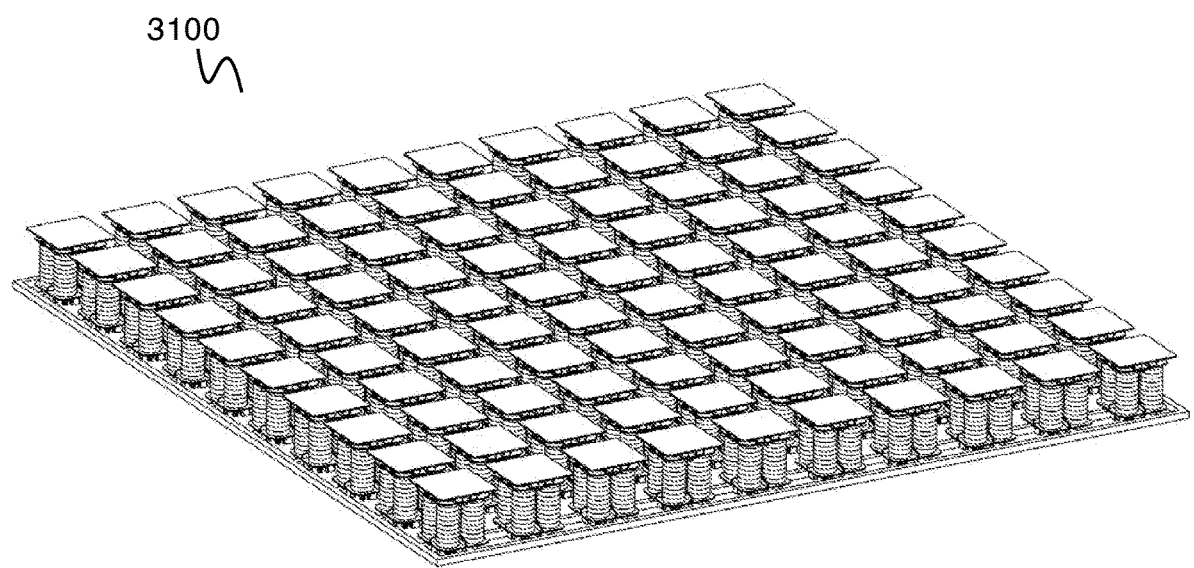
FIG. 31 is a diagram illustrating an embodiment of an actuator array.

FIG. 31 is a diagram illustrating an embodiment of an actuator array. In some embodiments, actuator array 3100 comprises an array of solar actuators (e.g., solar actuator 1900 of FIG. 19). In the example shown, actuator array 3100 comprises a ten by ten actuator array. In some embodiments, actuator array 3100 is controlled using a control array (e.g., control array 3000 of FIG. 30).

In some embodiments, the bottom coupler comprises the ground and the actuators are coupled to the coupler.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A fluidic solar actuation system, the fluidic solar actuation system comprising:
   a set of a plurality of fluidic solar actuators that each include:
   a top coupler;
   an angled bottom coupler having a top-end and respective first and second planar faces on opposing first and second sides of the top-end, the angled bottom coupler coupled to the top coupler via a linear one-degree-of-freedom rotatable joint between the top coupler and the angled bottom coupler, the linear one-degree-of-freedom rotatable joint having no more than one axis of rotation, and
   at least a first and second fluidic inflatable actuator, with the first fluidic inflatable actuator disposed on the first side of the angled bottom coupler engaging the first planar face and the second fluidic inflatable actuator disposed antagonistically from the first fluidic inflatable actuator on the second side of the angled bottom coupler engaging the second planar face;
   a shared fluid source that stores a fluid;
   a fluidic routing system comprising a plurality of fluid tubes configured to covey the fluid originating from the shared fluid source to each of the first and second fluidic inflatable actuators of each of the fluidic solar actuators of the set of the plurality of fluidic solar actuators, with a set of the first fluidic inflatable actuators being ganged so as to be fluidically connected and with a set of the second fluidic inflatable actuators being ganged so as to be fluidically connected; and
   a central electronic control system that controls a plurality of valves of a valve system, the valve system controlling conveyance of the fluid originating from the shared fluid source to each of the first and second fluidic inflatable actuators of each of the fluidic solar actuators of the set of the plurality of fluidic solar actuators, including to the ganged sets of the first and second fluidic inflatable actuators, the central electronic control system controlling conveyance of the fluid to cause each of the plurality of fluidic solar actuators to be positioned based at least in part a position of the sun by selectively introducing fluid from the shared fluid source into the first and second fluidic inflatable actuators of the fluidic solar actuators via the plurality of fluid tubes.

2. The fluidic solar actuation system of claim 1, further comprising a plurality of photovoltaic panels disposed on the plurality of fluidic solar actuators, and wherein causing each of the plurality of fluidic solar actuators to be positioned based at least in part the position of the sun causes the plurality of photovoltaic panels to be positioned based at least in part the position of the sun.

3. The fluidic solar actuation system of claim 1, wherein the set of the first fluidic inflatable actuators are ganged so as to be fluidically connected such that the first fluidic inflatable actuators are configured to be inflated together and separate from the set of the second fluidic inflatable actuators, and wherein the set of the second fluidic inflatable actuators are ganged so as to be fluidically connected such that the second fluidic inflatable actuators are configured to be inflated together and separate from the set of the first fluidic inflatable actuators.

4. The fluidic solar actuation system of claim 1, wherein the angled bottom coupler is V-shaped.

5. A fluidic solar actuation system, the fluidic solar actuation system comprising:
   a set of a plurality of fluidic solar actuators that each include:
   a top coupler;
   an angled bottom coupler, and
   at least a first and second fluidic inflatable actuator;
   a shared fluid source that stores a fluid;
   a fluidic routing system comprising a plurality of fluid tubes configured to covey the fluid originating from the shared fluid source to each of the first and second fluidic inflatable actuators of each of the fluidic solar actuators of the set of the plurality of fluidic solar actuators, with a set of the first fluidic inflatable actuators being ganged so as to be fluidically connected and with a set of the second fluidic inflatable actuators being ganged so as to be fluidically connected; and
   a central electronic control system that controls a plurality of valves of a valve system.

6. The fluidic solar actuation system of claim 5, wherein the angled bottom coupler has a top-end and respective first and second planar faces on opposing first and second sides of the top-end, the angled bottom coupler coupled to the top coupler via a linear one-degree-of-freedom rotatable joint between the top coupler and the angled bottom coupler, the linear one-degree-of-freedom rotatable joint having no more than one axis of rotation.

7. The fluidic solar actuation system of claim 6, wherein with the first fluidic inflatable actuator disposed on the first side of the angled bottom coupler engaging the first planar face and the second fluidic inflatable actuator disposed antagonistically from the first fluidic inflatable actuator on the second side of the angled bottom coupler engaging the second planar face.

8. The fluidic solar actuation system of claim 5, wherein the valve system controls conveyance of the fluid originating from the shared fluid source to each of the first and second fluidic inflatable actuators of each of the fluidic solar actuators of the set of the plurality of fluidic solar actuators, including to the ganged set of the first and second fluidic inflatable actuators, the central electronic control system controlling conveyance of the fluid to cause each of the plurality of fluidic solar actuators to be positioned based at least in part a position of the sun by selectively introducing fluid from the shared fluid source into the first and second fluidic inflatable actuators of the fluidic solar actuators via the plurality of fluid tubes.

9. The fluidic solar actuation system of claim 5, wherein the set of the first fluidic inflatable actuators are ganged so as to be fluidically connected such that the first fluidic inflatable actuators are configured to be inflated together and separate from the set of the second fluidic inflatable actuators, and wherein the set of the second fluidic inflatable actuators are ganged so as to be fluidically connected such that the second fluidic inflatable actuators are configured to be inflated together and separate from the set of the first fluidic inflatable actuators.

10. The fluidic solar actuation system of claim 5, wherein the angled bottom coupler is V-shaped.

11. A fluidic solar actuation system, the fluidic solar actuation system comprising:
  a plurality of fluidic solar actuators that each include:
    a first fluidic inflatable actuator, and
    second fluidic inflatable actuator,
  a fluidic routing system configured to covey a fluid originating from a fluid source to:
  the respective first fluidic inflatable actuators of the plurality of fluidic solar actuators, the first fluidic inflatable actuators ganged so as to be fluidically connected such that the first fluidic inflatable actuators are configured to be inflated together and separate from the second fluidic inflatable actuators, and
  the respective second fluidic inflatable actuators of the plurality of fluidic solar actuators, the second fluidic inflatable actuators ganged so as to be fluidically connected such that the second fluidic inflatable actuators are configured to be inflated together and separate from the first fluidic inflatable actuators.

12. The fluidic solar actuation system of claim 11, wherein each of the plurality of fluidic solar actuators comprise:
  a top coupler; and
  a bottom coupler.

13. The fluidic solar actuation system of claim 12, wherein the bottom coupler is V-shaped.

14. The fluidic solar actuation system of claim 12, wherein the bottom coupler has a top-end and respective first and second planar faces on opposing first and second sides of the top-end.

15. The fluidic solar actuation system of claim 12, wherein the bottom coupler is coupled to the top coupler via a linear one-degree-of-freedom rotatable joint between the top coupler and the bottom coupler.

16. The fluidic solar actuation system of claim 15, wherein the linear one-degree-of-freedom rotatable joint has no more than one axis of rotation.

17. The fluidic solar actuation system of claim 12, wherein the first fluidic inflatable actuator is disposed on a first side of the bottom coupler engaging a first planar face of the bottom coupler and wherein the second fluidic inflatable actuator is disposed antagonistically from the first fluidic inflatable actuator on a second side of the bottom coupler engaging a second planar face of the bottom coupler.

18. The fluidic solar actuation system of claim 11, further comprising a shared fluid source that stores a fluid.

19. The fluidic solar actuation system of claim 18, wherein the fluidic routing system comprises a plurality of fluid tubes configured to covey the fluid originating from the shared fluid source to each of the first and second fluidic inflatable actuators of each of the fluidic solar actuators of the plurality of fluidic solar actuators.

20. The fluidic solar actuation system of claim 11, further comprising a central electronic control system that controls conveyance of a fluid originating from a fluid source to:
  the respective first fluidic inflatable actuators of the plurality of fluidic solar actuators, and
  the respective second fluidic inflatable actuators of the plurality of fluidic solar actuators.

* * * * *